(12) United States Patent
Merino Vazquez et al.

(10) Patent No.: US 12,445,827 B2
(45) Date of Patent: Oct. 14, 2025

(54) NETWORK NODES AND METHODS PERFORMED THEREBY FOR HANDLING SUBSCRIPTIONS IN A COMMUNICATIONS NETWORK

(71) Applicant: Telefonaktiebolaget LM Ericsson (publ), Stockholm (SE)

(72) Inventors: Emiliano Merino Vazquez, Madrid (ES); Miguel Angel Garcia Martin, Madrid (ES); Beatriz Maroto Gil, Madrid (ES); David Castellanos Zamora, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 412 days.

(21) Appl. No.: 17/921,471

(22) PCT Filed: Jun. 29, 2020

(86) PCT No.: PCT/EP2020/068262
§ 371 (c)(1),
(2) Date: Oct. 26, 2022

(87) PCT Pub. No.: WO2021/219237
PCT Pub. Date: Nov. 4, 2021

(65) Prior Publication Data
US 2023/0209326 A1    Jun. 29, 2023

(30) Foreign Application Priority Data

Apr. 28, 2020 (EP) ..................... 20382344

(51) Int. Cl.
*H04W 8/08* (2009.01)
*H04W 88/06* (2009.01)

(52) U.S. Cl.
CPC .............. *H04W 8/08* (2013.01); *H04W 88/06* (2013.01)

(58) Field of Classification Search
CPC ......... H04W 8/08; H04W 88/06; H04W 8/10; H04W 8/06
See application file for complete search history.

(56) References Cited

PUBLICATIONS

Ericsson, Common Network Exposure, E-Meeting, Apr. 15-24, 2020, 3GPP TSG-CT WG4 Meeting #97e, C4-202513). (Year: 2020).*

(Continued)

*Primary Examiner* — Said M Elnoubi
(74) *Attorney, Agent, or Firm* — Weisberg I.P. Law, P.A.

(57) ABSTRACT

A method, performed by a first node (111), for handling subscriptions in a communications network (100). The first node (111) operates in the communications network (100). The first node (111) sends (303), to a second node (112), a first indication. The first indication requests subscription to report new accessibility for a device (140) to a second domain different than a first domain currently accessible by the device (140). The first node (111) receives (304) a second indication from the second node (112). The second indication indicates the new accessibility by the device (140) to the second domain. A fifth node (115) receives (501), from the first node (111), a fifth indication indicating a notification of an event by the device (140) after the new accessibility has been enabled. The fifth indication is received based on a previous indication sent by the fifth node (115) prior to the new accessibility has been enabled.

20 Claims, 11 Drawing Sheets

(56) References Cited

PUBLICATIONS

Convida Wireless LLC et al., Concluding Key Issue #9, Jul. 2-6, 2018SA WG2 Meeting #128, S2-187216,, Vilnius, Lithuania (Year: 2018).*

3GPP TS 23.501 v16.3.0; Technical Specification; 3rd Generation Partnership Project; Technical Specification Group Services and System Aspects; System architecture for the 5G System (5GS); Stage 2 (Release 16)—Dec. 2019.

3GPP TS 23.502 v16.3.0; Technical Specification; 3rd Generation Partnership Project; Technical Specification Group Services and System Aspects; Procedures for the 5G System (5GS); Stage 2 (Release 16)—Dec. 2019.

3GPP TS 23.632 v16.0.0; Technical Specification; 3rd Generation Partnership Project; Technical Specification Group Core Network and Terminals; User data interworking, coexistence and migration; Stage 2 (Release 16)—Dec. 2019.

3GPP TS 23.682 v16.5.0; Technical Specification; 3rd Generation Partnership Project; Technical Specification Group Services and System Aspects; Architecture enhancements to facilitate communications with packet data networks and applications (release 16)—Dec. 2019.

3GPP TSG-CT WG4 Meeting #97e; E-Meeting; Change Request; Title: Common Network Exposure (C4-202513)—Apr. 15-24, 2020.

SA WG2 Meeting #128, Vilnius, Lithuania; Source: Convida Wireless LLC, AT&T, Huawei, Hisilicon, Nokia, Nokia Shanghai Bell; Title: Concluding Key Issue #9 (S2-187216)—Jul. 2-6, 2018.

3GPP TSG-SA WG2 Meeting #134; Sapporo, Japan; Change Request; Title: Clarification of service exposure in interworking scenario (S2-1907526)—Jun. 24-28, 2019.

3GPP TSG-SA WG2 Meeting #138E; Apr. 20-24, 2020; Electronic Meeting; Change Request; Title: Common Network Exposure (S2-2002713)—Apr. 20-24, 2020.

PCT International Search Report issued for International application No. PCT/EP2020/068262—Feb. 11, 2021.

PCT Written Opinion of the International Searching Authority issued for International application No. PCT/EP2020/068262—Feb. 11, 2021.

* cited by examiner a)

b)

a)

b)

a)

b)

a)

b)

NETWORK NODES AND METHODS PERFORMED THEREBY FOR HANDLING SUBSCRIPTIONS IN A COMMUNICATIONS NETWORK

PRIORITY

This nonprovisional application is a U.S. National Stage Filing under 35 U.S.C. § 371 of International Patent Application Serial No. PCT/EP2020/068262 filed Jun. 29, 2020, and entitled "Network Nodes and Methods Performed Thereby for Handling Subscriptions in a Communications Network" which claims priority to European Patent Application Serial No. EP 20382344.8 filed Apr. 28, 2020 both of which are hereby incorporated by reference in their entirety.

TECHNICAL FIELD

The present disclosure relates generally to a first node and methods performed thereby for handling subscriptions in a communications network. The present disclosure also relates generally to a second node, and methods performed thereby for handling subscriptions in a communications network. The present disclosure further relates generally to a fifth node and methods performed thereby for handling subscriptions in a communications network. The present disclosure also relates generally to computer programs and computer-readable storage mediums, having stored thereon the computer programs to carry out these methods.

BACKGROUND

Computer systems in a communications network may comprise one or more nodes, which may also be referred to simply as nodes. A node may comprise one or more processors which, together with computer program code may perform different functions and actions, a memory, a receiving port and a sending port. A node may be, for example, a server. Nodes may perform their functions entirely on the cloud.

Devices within a telecommunications network may be user equipments (UEs), e.g., stations (STAs), wireless devices, mobile terminals, wireless terminals, terminals, and/or Mobile Stations (MS). User equipments are enabled to communicate wirelessly in a cellular communications network or wireless communication network, sometimes also referred to as a cellular radio system, cellular system, or cellular network. The communication may be performed e.g., between two user equipments, between a user equipment and a regular telephone, and/or between a user equipment and a server via a Radio Access Network (RAN), and possibly one or more core networks, comprised within the telecommunications network. Devices may further be referred to as mobile telephones, cellular telephones, laptops, or tablets with wireless capability, just to mention some further examples. The devices in the present context may be, for example, portable, pocket-storable, hand-held, computer-comprised, or vehicle-mounted mobile devices, enabled to communicate voice and/or data, via the RAN, with another entity, such as another terminal or a server.

The telecommunications network may cover a geographical area which may be divided into cell areas, each cell area being served by a network node, e.g., a radio network node or Transmission Point (TP), for example, an access node such as a Base Station (BS), e.g. a Radio Base Station (RBS), which sometimes may be referred to as e.g., evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The telecommunications network may also be a non-cellular system, comprising network nodes which may serve receiving nodes, such as user equipments, with serving beams.

In 3rd Generation Partnership Project (3GPP) Long Term Evolution (LTE), base stations, which may be referred to as eNodeBs or even eNBs, may be directly connected to one or more core networks. All data transmission in LTE is controlled by the radio base station.

The standardization organization 3GPP is currently in the process of specifying a New Radio Interface called NR or 5G-UTRA, as well as a Fifth Generation (5G) Packet Core Network, which may be referred to as 5G Core Network, abbreviated as 5GC.

Telecommunication networks are designed in development waves or generations. For example, 3GPP has specified the 3rd, 4th, and 5th generation of mobile and fixed telecommunication networks. Users expect that each generation adds new services, still keeping their existing services from the previous generation available. For example, they expect that if a multi-generation device is connected to a 5G network, the network still provides the same set of services as in 4G, and perhaps additional 5G-only services.

Current 3GPP networks may comprise a mixture of domains. A domain may be understood herein as a standardized technology, built to be compliant with a set of specifications, determining the operation of a core network in a telecommunications network. Each domain may be typically designed according to a generation. A typical telecommunication network may comprise the 2G, 3G, 4G, and 5G domains.

According to today's standard solutions, services delivered over one of these domains, e.g., the 4G domain, are expected to work seamlessly in more advanced domains, e.g., the 5G domain. 3GPP standards have recreated in the 5G domain most of the services of the 4G domain. However, the migration to new domains lacks full continuity, and in some cases, there can be a service interruption when the user is upgraded or allowed to use a new domain.

SUMMARY

It is an object of embodiments herein to improve the handling of subscriptions in a communications network.

According to a first aspect of embodiments herein, the object is achieved by a method, performed by a first node. The method is for handling subscriptions in a communications network. The first node operates in the communications network. The first node sends, to a second node operating in the communications network, a first indication. The first indication requests subscription to report new accessibility for a device. The new accessibility is to a second domain different than a first domain currently accessible by the device operating in the communications network. The first node also receives a second indication from the second node. The second indication indicates the new accessibility by the device to the second domain.

According to a second aspect of embodiments herein, the object is achieved by a method, performed by a second node. The method is for handling subscriptions in the communications network. The second node operates in the communications network. The second node receives, from the first node operating in the communications network, the first indication. The first indication requests subscription to report new accessibility for the device to the second domain. The second domain is different than the first domain currently accessible by the device operating in the communications network. The second node sends the second indication to the first node operating in the communications network. The second indication indicates the new accessibility by the device to the second domain.

According to a third aspect of embodiments herein, the object is achieved by a method, performed by a fifth node. The method is for handling subscriptions in the communications network. The fifth node operates in the communications network. The fifth node receives, from the first node operating in the communications network the fifth indication. The fifth indication indicates a notification of an event by the device operating in the communications network. The receiving of the fifth indication and the event have taken place after the new accessibility for the device to the second domain has been enabled in the communications network. The receiving of the fifth indication is based on a second previous indication sent by the fifth node to the first node. The second previous indication has been sent prior to the new accessibility for the device to the second domain has been enabled.

According to a fourth aspect of embodiments herein, the object is achieved by the first node, for handling subscriptions in the communications network. The first node is configured to operate in the communications network. The first node is further configured to send, to the second node configured to operate in the communications network, the first indication. The first indication is configured to request subscription to report new accessibility for the device. The new accessibility is to the second domain different than the first domain configured to be currently accessible by the device. The device is configured to operate in the communications network. The first node is also configured to receive the second indication from the second node. The second indication is configured to indicate the new accessibility by the device to the second domain.

According to a fifth aspect of embodiments herein, the object is achieved by the second node, for handling subscriptions in the communications network. The second node is configured to operate in the communications network. The second node is further configured to receive, from the first node configured to operate in the communications network, the first indication. The first indication is configured to request subscription to report new accessibility for the device. The new accessibility is to the second domain different than the first domain configured to be currently accessible by the device. The device is configured to operate in the communications network. The second node is further configured to send the second indication to the first node configured to operate in the communications network. The second indication is configured to indicate the new accessibility by the device to the second domain.

According to a sixth aspect of embodiments herein, the object is achieved by the fifth node, for handling subscriptions in the communications network. The fifth node is configured to operate in the communications network. The fifth node is further configured to receive, from the first node configured to operate in the communications network, the fifth indication. The fifth indication is configured to indicate the notification of the event by the device configured to operate in the communications network. The receiving of the fifth indication and the event are configured to have taken place after a new accessibility for the device to the second domain has been enabled in the communications network. The receiving of the fifth indication is configured to be based on the second previous indication configured to be sent by the fifth node to the first node. The second previous indication is configured to have been sent prior to the new accessibility for the device to the second domain has been enabled.

According to a seventh aspect of embodiments herein, the object is achieved by a computer program, comprising instructions which, when executed on at least one processor, cause the at least one processor to carry out the method performed by the first node.

According to an eighth aspect of embodiments herein, the object is achieved by a computer-readable storage medium, having stored thereon the computer program, comprising instructions which, when executed on at least one processor, cause the at least one processor to carry out the method performed by the first node.

According to an ninth aspect of embodiments herein, the object is achieved by a computer program, comprising instructions which, when executed on at least one processor, cause the at least one processor to carry out the method performed by the second node.

According to a tenth aspect of embodiments herein, the object is achieved by a computer-readable storage medium, having stored thereon the computer program, comprising instructions which, when executed on at least one processor, cause the at least one processor to carry out the method performed by the second node.

According to a eleventh aspect of embodiments herein, the object is achieved by a computer program, comprising instructions which, when executed on at least one processor, cause the at least one processor to carry out the method performed by the fifth node.

According to a twelfth aspect of embodiments herein, the object is achieved by a computer-readable storage medium, having stored thereon the computer program, comprising instructions which, when executed on at least one processor, cause the at least one processor to carry out the method performed by the fifth node.

By the first node sending the first indication to the second node requesting subscription to report the new accessibility for the device to the second domain, the first node is then enabled to receive the second indication indicating the new accessibility by the device to the second domain. By receiving the second indication, the first node may be understood to then be enabled to manage subscriptions by other nodes, such as the fifth node, in relation to the device, based on the new accessibility to the second domain, and send the fifth indication to the fifth node. By the fifth node receiving the fifth indication indicating the notification of the event after the new accessibility to the second domain has been enabled, the fifth node may be enabled to continue to receive notifications regarding the event it may have been monitoring prior to the new accessibility for the device to the second domain has been enabled, seamlessly, across different, e.g., more advanced, domains. That is, the first node may enable the fifth node to continue to monitor any event or events it may wish to monitor with regards to the device, seamlessly across different, e.g., more advanced, domains.

BRIEF DESCRIPTION OF THE DRAWINGS

Examples of embodiments herein are described in more detail with reference to the accompanying drawings, according to the following description.

DETAILED DESCRIPTION

As part of the development of embodiments herein, a problem with exiting methods will first be identified and discussed.

Figure 1A:
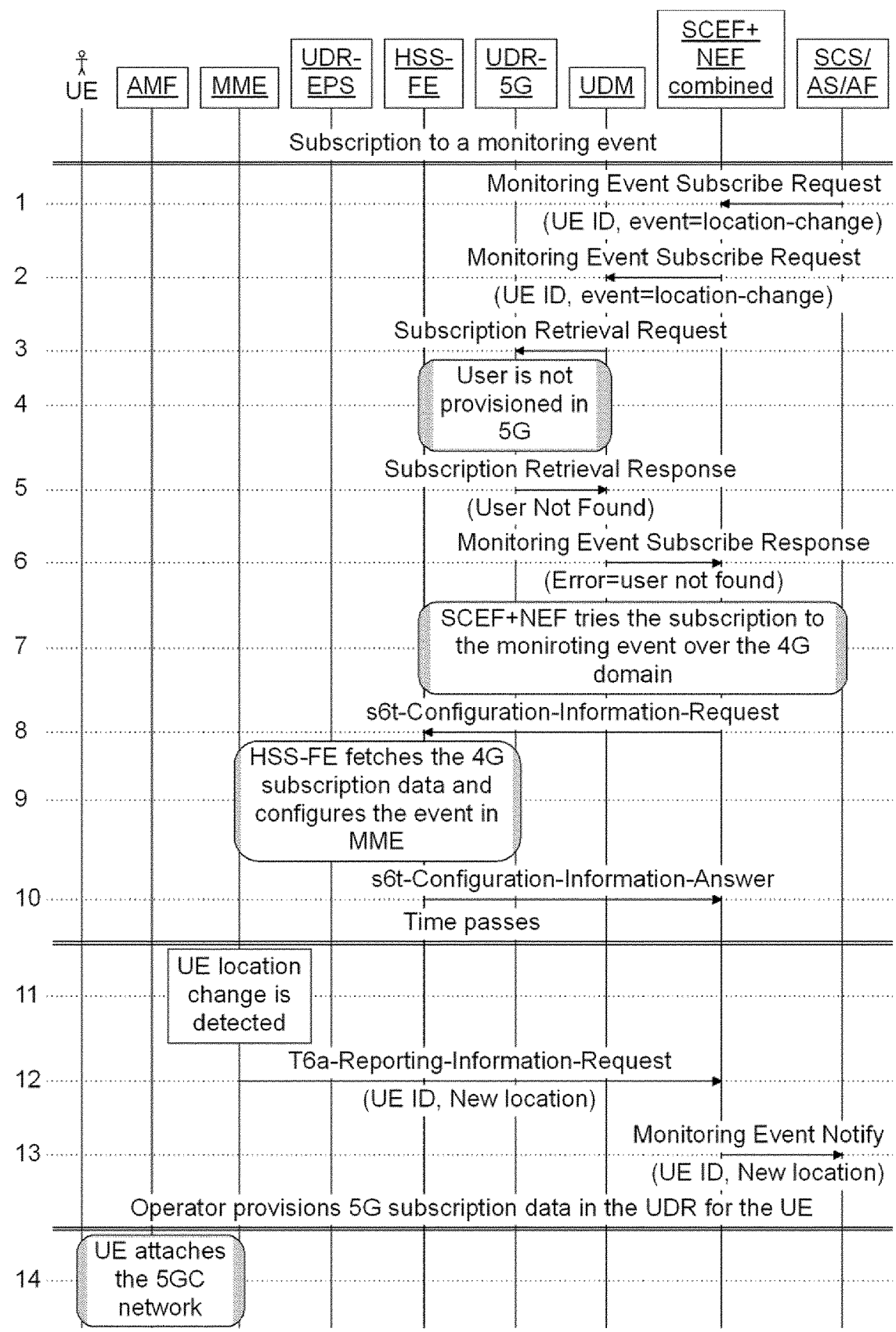
FIG. 1 is a schematic diagram, divided in a first part in FIG. 1A and a second part in FIG. 1B, illustrating a problem description sequence diagram.
Figure 1B:
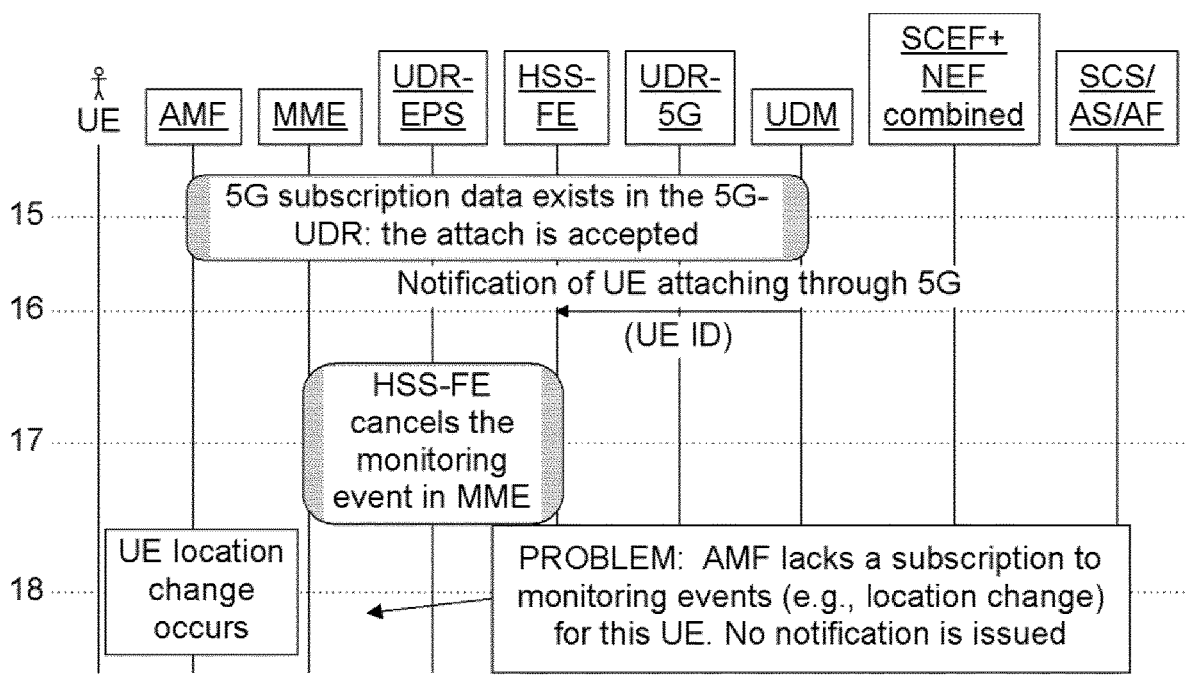

The problem is described with the help of FIG. 1, which is divided in a first part in FIG. 1A and a second part in FIG. 1B, which illustrates the use case that exists when a service is being provided for a user that is subscribed or enabled in a first domain, e.g., Evolved Packet System (EPS), but not yet in another one, e.g., 5G System (5GS).

FIG. 1 illustrates a service that requires a subscription to a monitoring event of the UE, for example, for determining when the UE is entering a new location. When the user is eventually subscribed or enabled in a new domain and the user moves to the newly provisioned domain, the service ceases, because service procedures in this second domain are not duly activated. In the use case depicted, the consumer of the service is not aware of the new domain provisioned and used by the UE.

In step 1, a Service Capability Server (SCS), or an Application Server (AS), or Application Function (AF) require to subscribe to an event, e.g., location change, for a given user, so that the SCS, AS or AF may be duly notified when the monitoring event is detected, e.g., when the User Equipment (UE) changes its location. Therefore, the SCS/AS/AF, being located beyond the operator's trust domain, sends to either the Service Capability Exposure Function (SCEF) in the 4G domain or its corresponding Network Exposure function (NEF) in the 5G domain, a subscription for the monitoring event of the given UE.

In the sequence diagram, the assumption is that a single network function is able to cope with the roles of the SCEF in the 4G domain and the NEF in the 5G domain. We denote this combined network function SCEF+NEF. This subscription does require notifications, no matter which the domain of the UE is using.

In step 2, the SCEF+NEF first attempts the subscription towards one of the domains, in this case, SCEF+NEF forwards the subscription to the 5G domain, that is, the most modern domain, to the Unified Data Management (UDM) network function.

In step 3, the UDM fetches the 5G subscription data from the Unified Data Repository (UDR) network function. However, this user is only defined in the 4G domain. Therefore, in step 4, there is no 5G subscription for this user stored into UDR, so, in step 5, a negative response is sent to UDM.

In step 6, the UDM generates an error message indicating to the SCEF+NEF that no such user is found in the 5G domain.

In step 7, the SCEF+NEF decides to reattempt the subscription over the 4G domain, in particular, towards the Home Subscriber Server (HSS) Front End (FE), in case the user is defined in the 4G domain.

In step 8, the SCEF+NEF forwards the subscription over the 4G domain to the HSS-FE In step 9, the HSS-FE retrieves the 4G subscription data for this user from the 4G UDR. Since the UE is provisioned over the 4G domain, there is existing subscription data. The HSS-FE, then, configures the Mobility Management Entity (MME) with the requested event monitoring subscription, for example, in this case, the monitoring event is for a notification to changes of the UE location. The HSS-FE instructs the MME to provide notifications directly to the SCEF+NEF.

In step 10, the MME informs the HSS-FE of the success in the MME configuration to provide notifications to changes of the UE location.

In step 11, after time has passed, the MME detects that a change in the UE location.

In step 12, the MME sends a notification to the SCEF+NEF of the UE location change.

In step 13 the SCEF+NEF forwards the notification to the SCS/AS/AF that requested such notification.

So far, the description has illustrated a regular operation where SCS/AS/AF gets notifications for a configured monitoring event of the UE. But let us assume now that the operator provisions the user in the 5G domain, and the user joins the telecommunication network through the 5G domain. In step 13, the device attaches to the 5G Core (5GC) network using regular procedures.

In step 14, the UE attaches now to the 5G Core (5GC) network.

In step 15, since the user is provisioned in the 5G domain, in particular in the 5G UDR, the attachment is accepted.

In step 16, the UDM, which has received the attachment and registration of the UE to the 5G domain, informs the 4G HSS-FE about the UE registering in the 5GC network/domain, according to regular procedures specified in 3GPP TS 23.632 [3]. The HSS-FE cancels/removes, if required, the location in 4G domain.

In step 17, the HSS-FE contacts the MME and cancels the UE existing data in the MME, including the subscriptions to monitoring events.

In step 18, the Access and mobility Management Function (AMF) determines that the UE location has changed. Unfortunately, the AMF does not have an existing subscription for monitoring the location of the UE or any other monitoring event. Therefore, the AMF does not notify this change to any other existing network function. Moreover, even if the UE location does not change after the registration in 5GC, the SCS/AS/AF did not receive the notification of the new location in 5G domain since AMF was not aware of the event being monitored already in the initial domain. Hence, AMF did not report the location. As a consequence, the SCS/AS/AF is never notified of the changes to the UE location once the UE is allowed to access the 5G domain. This may in turn lead to, e.g., the SCS/AS/AF not being able to provide, for example, disaster relieve advisories related to the current location of the UE, when the UE is accessing the network through the 5G domain.

Embodiments herein may therefore be understood to mitigate the above-mentioned problem. As a summarized overview with an illustrative example, embodiments herein may comprise the following actions. A node, e.g., the SCEF-NEF, may subscribe to receive notifications when a user may be upgraded to access a new domain. In the subscription, the node, e.g., the SCEF, may indicate which new domain(s) provisioned to the UE should be notified. As an example, the node, e.g., the SCEF-NEF may subscribe to receive these notifications from another node, e.g., from HSS-FE or directly from the UDR/Provisioning Server. The node may decide to subscribe based on indication from the other node, e.g., the HSS-FE, of the capability to provide information when the user may be provisioned with subscription profile data to access a new domain, e.g., 5GS domain, or based on other means, e.g., local configuration in SCEF-NEF.

Upon receiving the notification that a UE for which the node, e.g., the SCEF-NEF, had subscribed to, has been upgraded to the new domain, from e.g., the HSS-FE or from the UDR/Provisioning server, the node, e.g., the SCEF-NEF, may send over the new domain a regular subscription to the desired event to be monitored.

In summary, embodiments herein may therefore be understood to be related to a cross-domain service continuity.

The embodiments will now be described more fully hereinafter with reference to the accompanying drawings, in which examples are shown. In this section, embodiments herein are illustrated by exemplary embodiments. It should be noted that these embodiments are not mutually exclusive. All possible combinations are not described to simplify the description. Components from one embodiment or example may be tacitly assumed to be present in another embodiment or example and it will be obvious to a person skilled in the art how those components may be used in the other exemplary embodiments.

Figure 2:
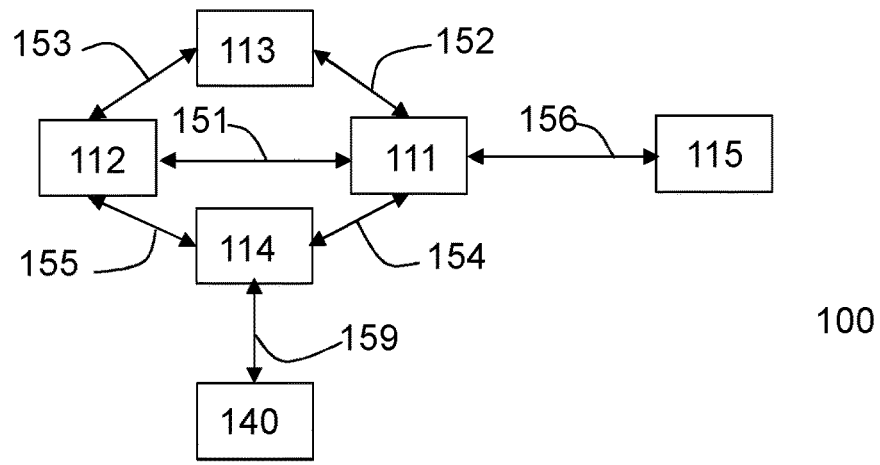
FIG. 2 is a schematic diagram illustrating a non-limiting example of a communications network, according to embodiments herein.
Figure 2:
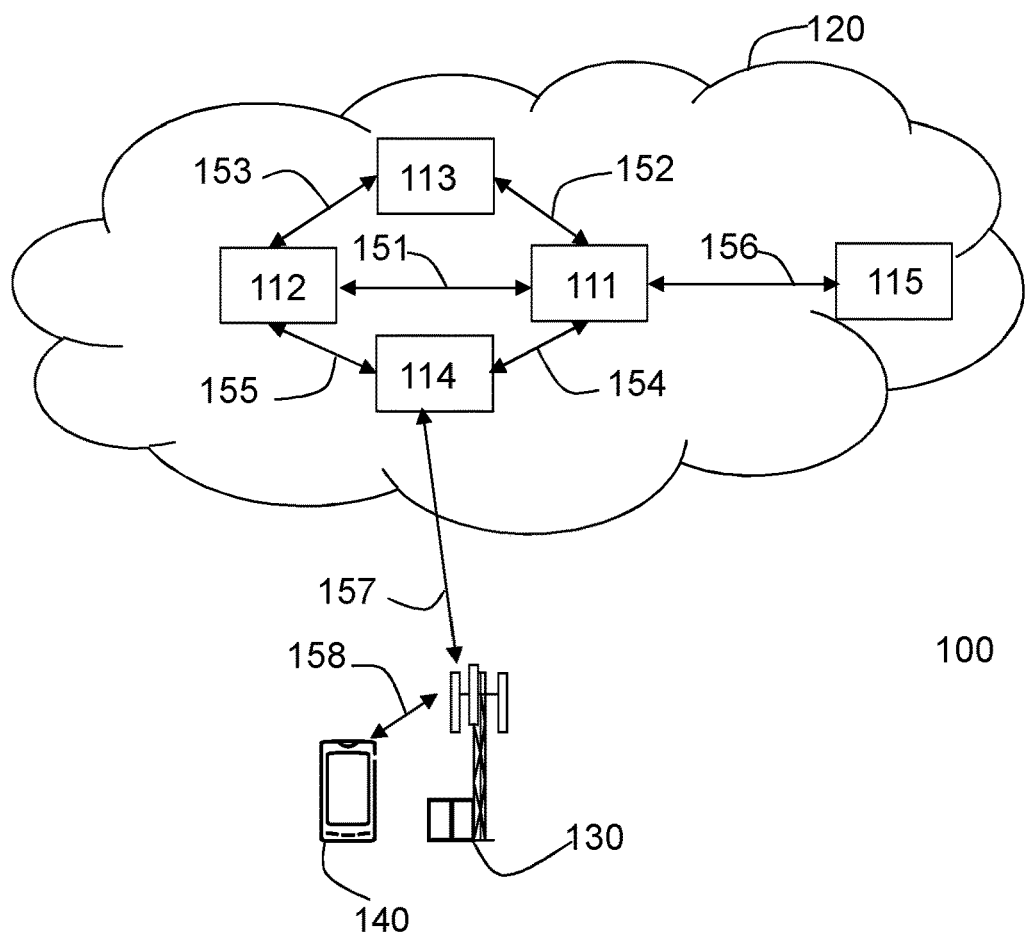

FIG. 2 depicts two non-limiting examples, in panels "a" and "b", respectively, of a communications network 100, in which embodiments herein may be implemented. In some example implementations, such as that depicted in the non-limiting example of FIG. 2a, the communications network 100 may be a computer network. In other example implementations, such as that depicted in the non-limiting example of FIG. 2b, the communications network 100 may be implemented in a telecommunications network, sometimes also referred to as a cellular radio system, cellular network or wireless communications system. In some examples, the telecommunications network may comprise network nodes which may serve receiving nodes, such as wireless devices, with serving beams.

In some examples, the telecommunications network may for example be a network such as 5G system, or a newer system supporting similar functionality. The telecommunications network may also support other technologies, such as a Long-Term Evolution (LTE) network, e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, Wireless Local Area Network/s (WLAN) or WiFi network/s, Worldwide Interoperability for Microwave Access (WiMax), IEEE 802.15.4-based low-power short-range networks such as IPv6 over Low-Power Wireless Personal Area Networks (6LowPAN), Zigbee, Z-Wave, Bluetooth Low Energy (BLE), or any cellular network or system. The telecommunications network may for example support a Low Power Wide Area Network (LPWAN). LPWAN technologies may comprise Long Range physical layer protocol (LoRa), Haystack, SigFox, LTE-M, and Narrow-Band IoT (NB-IoT).

In the communications network 100, a domain may be understood as a standardized technology, built to be compliant with a set of technical specifications, determining the operation of a core network in the telecommunications network. A domain may comprise a collection of technologies implemented in a variety of network functions cooperating for providing services to devices.

Although terminology from Long Term Evolution (LTE)/5G has been used in this disclosure to exemplify the embodiments herein, this should not be seen as limiting the scope of the embodiments herein to only the aforementioned system. Other wireless systems, supporting similar or equivalent functionality may also benefit from exploiting the ideas covered within this disclosure. In future telecommunication networks, e.g., in the sixth generation (6G), the terms used herein may need to be reinterpreted in view of possible terminology changes in future technologies.

The communications network 100 may comprise a plurality of nodes, whereof a first node 111, a second node 112, a third node 113, a fourth node 114 and a fifth node 115 are depicted in FIG. 2. Any of the first node 111, the second node 112, the third node 113, the fourth node 114 and the fifth node 115 may be understood, respectively, as a first computer system, a second computer system, a third computer system, a fourth computer system, and a fifth computer system. In some examples, any of the first node 111, the second node 112, the third node 113, the fourth node 114 and the fifth node 115 may be implemented as a standalone server in e.g., a host computer in the cloud 120. Any of the first node 111, the second node 112, the third node 113, the fourth node 114 and the fifth node 115 may in some examples be a distributed node or distributed server, with some of their respective functions being implemented locally, e.g., by a client manager, and some of its functions implemented in the cloud 120, by e.g., a server manager. Yet in other examples, any of the first node 111, the second node 112, the third node 113, the fourth node 114 and the fifth node 115 may also be implemented as processing resources in a server farm.

In some embodiments, any of the first node 111, the second node 112, the third node 113, the fourth node 114 and the fifth node 115 may be independent and separated nodes. In other embodiments, any of the first node 111, the second node 112, the third node 113, the fourth node 114 and the fifth node 115 may be co-located, or be the same node. All the possible combinations are not depicted in FIG. 2 to simplify the Figure.

In some examples of embodiments herein, the first node 111 may be a Service Capability Exposure Function (SCEF) in the 4G domain, or its corresponding Network Exposure Function (NEF) in the 5G domain, or a node capable of performing a similar function in the communications network 100.

The second node 112 may Home Subscriber Server (HSS) Front End (FE), e.g., in the 4G domain, or a node capable of performing a similar function in the communications network 100. The third node 113 may be a Unified Data Management (UDM) network function, or a node capable of performing a similar function in the communications network 100. The fourth node 114 may be an Access and Mobility Management Function (AMF), or a node capable of performing a similar function in the communications network 100. The fifth node 115 may be any of an a Service Capability Server (SCS), an Application Server (AS), or an Application Function (AF), or a node capable of performing a similar function in the communications network 100.

The communications network 100 may comprise one or more radio network nodes, whereof a radio network node 130 is depicted in FIG. 2b. The radio network node 130 may typically be a base station or Transmission Point (TP), or any other network unit capable to serve a wireless device or a machine type node in the communications network 100. The radio network node 130 may be e.g., a 5G gNB, a 4G eNB, or a radio network node in an alternative 5G radio access technology, e.g., fixed or WiFi. The radio network node 130 may be e.g., a Wide Area Base Station, Medium Range Base Station, Local Area Base Station and Home Base Station, based on transmission power and thereby also coverage size. The radio network node 130 may be a stationary relay node or a mobile relay node. The radio network node 130 may support one or several communication technologies, and its name may depend on the technology and terminology used. The radio network node 130 may be directly connected to one or more networks and/or one or more core networks.

The communications network 100 covers a geographical area which may be divided into cell areas, wherein each cell area may be served by a radio network node, although, one radio network node may serve one or several cells.

The communications network 100 comprises a device 140. The device 140 may be also known as e.g., a wireless device, mobile terminal, wireless terminal and/or mobile station, mobile telephone, cellular telephone, or laptop with wireless capability, or a Customer Premises Equipment (CPE), just to mention some further examples. The device 140 in the present context may be, for example, portable, pocket-storable, hand-held, computer-comprised, or a vehicle-mounted mobile device, enabled to communicate voice and/or data, via a RAN, with another entity, such as a server, a laptop, a Personal Digital Assistant (PDA), or a tablet computer, sometimes referred to as a tablet with wireless capability, or simply tablet, a Machine-to-Machine (M2M) device, a device equipped with a wireless interface, such as a printer or a file storage device, modem, Laptop Embedded Equipped (LEE), Laptop Mounted Equipment (LME), USB dongles, CPE or any other radio network unit capable of communicating over a radio link in the communications network 100. The device 140 may be wireless, i.e., it may be enabled to communicate wirelessly in the communications network 100 and, in some particular examples, may be able support beamforming transmission. The communication may be performed e.g., between two devices, between a device and a radio network node, and/or between a device and a server. The communication may be performed e.g., via a RAN and possibly one or more core networks, comprised, respectively, within the communications network 100. In some particular embodiments, the device 140 may be an IoT device, e.g., a NB IoT device.

The first node 111 may communicate with the second node 112 over a respective first link 151, e.g., a radio link or a wired link. The first node 111 may communicate with the third node 113 over a second link 152, e.g., a radio link or a wired link. The third node 113 may communicate with the second node 112 over a third link 153, e.g., a radio link or a wired link. The first node 111 may communicate with the fourth node 114 over a fourth link 154, e.g., a radio link or a wired link. The second node 112 may communicate with the fourth node 114 over a fifth link 155, e.g., a radio link or a wired link. The first node 111 may communicate with the fifth node 115 over a sixth link 156, e.g., a radio link or a wired link. The fourth node 114 may communicate with the radio network node 130 over a seventh link 157, e.g., a radio link or a wired link. The radio network node 130 may communicate with the device 140 over an eighth link 158, e.g., a radio link or a wired link. The fourth node 114 may communicate with the device 140 over a ninth link 159, e.g., a radio link or a wired link. Any of the seventh link 157, the eighth link 158, or the ninth link 159 may be a direct link or comprise one or more links, e.g., via one or more other nodes, network nodes, radio network nodes or core network nodes. Any of the first link 151, the second link 152, the third link 153, the fourth link 154, the fifth link 155, and the sixth link 156 may be a direct link or it may go via one or more computer systems or one or more core networks in the communications network 100, or it may go via an optional intermediate network. The intermediate network may be one of, or a combination of more than one of, a public, private or hosted network; the intermediate network, if any, may be a backbone network or the Internet, which is not shown in FIG. 2.

In general, the usage of "first", "second", "third", "fourth", "fifth", "sixth", "seventh", "eighth" and/or "ninth" herein may be understood to be an arbitrary way to denote different elements or entities, and may be understood to not confer a cumulative or chronological character to the nouns they modify.

Figure 3:
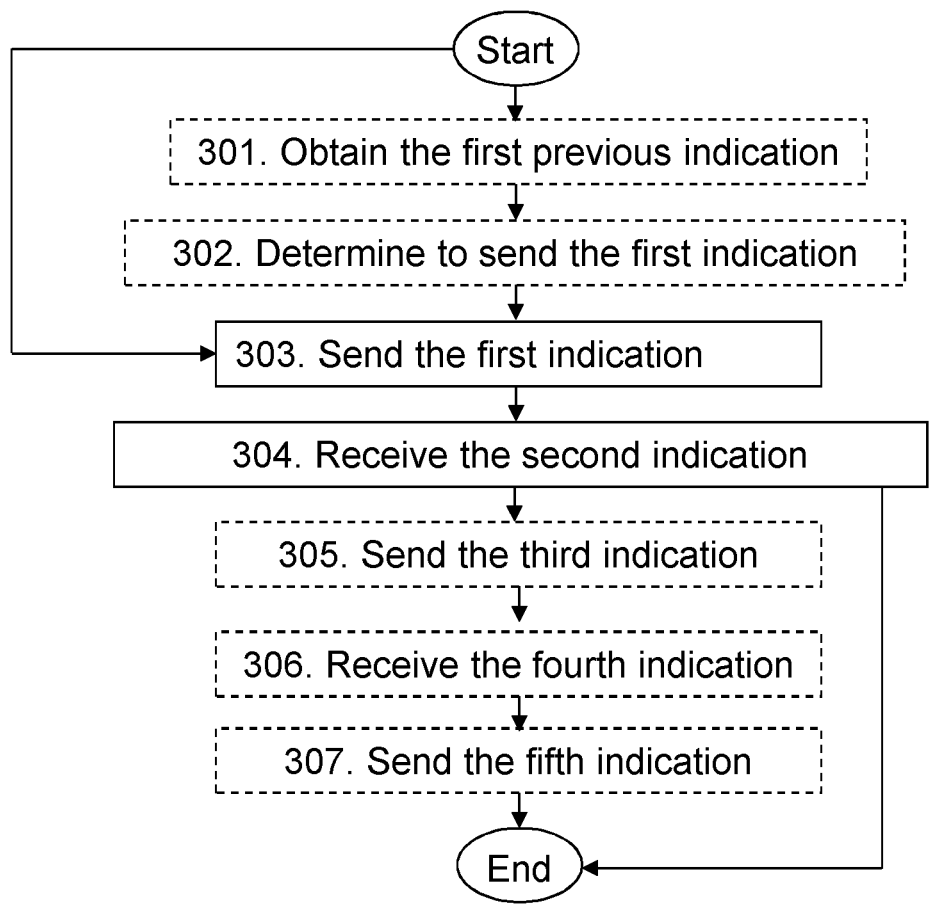
FIG. 3 is a flowchart depicting embodiments of a method in a first node, according to embodiments herein.

Embodiments of a method, performed by the first node 111, will now be described with reference to the flowchart depicted in FIG. 3. The method may be understood to be for handling subscriptions in the communications network 100. The first node 111 operates in the communications network 100.

The method may comprise the actions described below. In some embodiments some of the actions may be performed. In some embodiments all the actions may be performed. In FIG. 3, optional actions are indicated with a dashed box. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples.

Action 301

In this Action 301, the first node 111 may obtain an indication, referred to herein as a "first previous indication". The first previous indication may indicate a capability of the second node 112 to report accessibility for the device 140 to at least one additional domain in the communications network 100. The at least one additional domain may be understood to be a different domain than that which may be currently accessible by the device 140. In other words, the first previous indication may indicate the capability of the device 140 to change, e.g., upgrade, its accessibility to a new domain in the communications network 100. For example, a domain may be, e.g., 4G, and one additional domain may be, e.g., 5G.

In some embodiments, obtaining, may comprise retrieving from a memory, e.g., of the first node 111. In some embodiments, the obtaining 301 of the first previous indication may comprise receiving the previous indication from the second node 112, e.g., via the first link 151.

The first previous indication may be, for example, a configuration. In some examples of embodiments herein, the first previous indication may further comprise a list of the at least one additional domain, which may be a plurality of new detectable domains.

In some of the embodiments wherein obtaining may comprise receiving the first previous indication from the second node 112, the first previous indication may be received in response to a request from the first node 111. The request may identify the device 140 with e.g., a UE identifier. For example, the first previous indication may be an s6t-Configuration-Information-Answer in reply to an s6t-Configuration-Information-Request from the first node 111.

In some embodiments, the first node 111 may be one of a SCEF, or a NEF, and the second node 112 may one of a HSS-FE, a UDR or a Provisioning Server.

By obtaining the first previous indication, the first node 111 may be enabled to perform the next Action 302.

Action 302

In this Action 302, the first node 111 may determine to send a first indication, from the first node 111 to the second node 112, based on the obtaining 301 of the first previous indication. The first indication may be understood to be to request subscription to report new accessibility for the device 140 to a second domain different than a first domain currently accessible by the device 140 operating in the communications network 100. That the determining in this Action 302 may be based on the obtaining 301 of the first previous indication may be understood to mean that by receiving the first previous indication, the first node 111 may be enabled to know that it may request subscription to report new accessibility for the device 140 to additional domains. In other words, the receiving of the first previous indication may trigger the first node 111 to send the first indication in the next Action 303.

Determining may be understood as e.g., calculating, deciding.

Action 303

In this Action 303, the first node 111, sends, to the second node 112 operating in the communications network 100, the first indication. As stated earlier, the first indication requests subscription to report new accessibility for the device 140 to the second domain different than the first domain currently accessible by the device 140 operating in the communications network 100.

The first domain may be, for example, 4G. The second domain may be understood as another domain, e.g., 5GC. In typical embodiments, the second domain may be a more advanced or younger domain than the first domain.

The new accessibility may comprise any one of: provisioning and accessing. Provisioning may be understood as the act of providing or supplying data that may be needed, such as configuration data, for guaranteeing a possible or future access. Accessing may be understood as the act of the device 140 using the resources of the network for obtaining services, such as Internet connectivity, telephony service, messaging service, etc.

In this Action 303, the sending may be implemented, e.g., via the first link 151.

The first indication may be e.g., an s6t-Configuration-Information-Request. The first indication may comprise an identifier for the device 140. The first indication may further explicitly identify the second domain.

In the embodiments wherein Action 301 may be implemented, the first node 111 may obtain the first previous indication prior to sending 303 the first indication from the first node 111 to the second node 112.

The first node 111 may send the first indication based on the determination it may have performed in Action 302.

By sending the first indication, the first node 111 may be understood to be enabled to receive a report about any new accessibility for the device 140 to the second domain.

Action 304

During the course of communications in the communications network 100, the operator of the communications network 100 may provision a user of the device 140 in the second domain. The device 140 may then register with the communications network 100 in the second domain.

In this Action 304, the first node 111, receives a second indication from the second node 112. The second indication indicates the new accessibility by the device 140 to the second domain. The second indication may be, e.g., an s6t-Reporting-Information-Request identifying the device 140, as well as identifying the second domain.

In this Action 304, the receiving may be implemented, e.g., via the first link 151.

The receiving in this Action 304 may be understood to be based on the sent first indication, that is, on the first node 111 having sent the first indication.

By receiving the second indication, the first node 111 may be understood to be enabled to manage subscriptions by other nodes, e.g., the fifth node 115, in relation to the device 140, based on the new accessibility to the second domain. Therefore, the first node 111 may be enabled to continue to receive notifications regarding any event or events it may be monitoring on behalf of other nodes with regards to the device 140, seamlessly across different, e.g., more advanced, domains. That is, the first node 111 may enable other nodes such as the fifth node 115 to continue to monitor any event or events they may wish to monitor with regards to the device 140, seamlessly across different, e.g., more advanced, domains.

Action 305

In order to be able to continue to receive notifications regarding any event or events the first node 111 may be monitoring on behalf of other nodes with regards to the device 140 in the second domain, in this Action 305, the first node 111 may send a third indication to the third node 113 operating in the communications network 100. The third indication may indicate a second request to subscribe to an event for the device 140. The sending in this Action 305 of the third indication may be based on the receiving in Action 304 of the second indication.

The event may be an occurrence of a certain fact associated with the device 140. For example, the event may be a change in location of the device 140.

The event for the device 140 may be an event the first node 111 may have been already monitoring on behalf of another node in the communications network 100, e.g., the fifth node 115, in the first domain.

The sending in this Action 305 may be implemented, e.g., via the second link 152.

In some embodiments, the third node 113 may be a UDM.

Action 306

At some point in time, the event may occur. For example, if the event is for detecting a change in a location of the device 140, the device 140 may change its location. The first node 111 may then be informed about the occurrence of the event, even if the device 140 may now have accessed the second domain. Accordingly, the first node 111 may, in this Action 306, receive, from the fourth node 114 operating in the communications network 100, a fourth indication. The fourth indication may comprise a notification of the event. The receiving in this Action 306 of the fourth indication may be based on the sent third indication.

The fourth indication may be, e.g., a Monitoring Event Notify message. The fourth indication may comprise an identifier of the device 140, the registered event, and a content of the event, e.g., the location of the device 140.

The sending in this Action 307 may be implemented, e.g., via the fourth link 154.

In some embodiments, the fourth node 114 may be an AMF.

In some particular embodiments, the third node 113 may be a UDM, the fourth node 114 may be an AMF, and the fifth node 115 may be a SCS, an AS, or an AF.

Action 307

In this Action 307, the first node 111 may send, to the fifth node 115 operating in the communications network 100, a fifth indication. The fifth indication may indicate the notification of the event comprised in the fourth indication. The sending in this Action 307 of the fifth indication, and the event, may be understood to have taken place after the new accessibility for the device 140 to the second domain has been enabled in the communications network 100. The sending 307 of the fifth indication may be based on a second previous indication that may have been received by the first node 111 from the fifth node 115. The second previous indication may have been sent prior to the new accessibility for the device 140 to the second domain has been enabled. The second previous indication may be a request from the fifth node 115 to subscribe to a monitoring of the event. The second previous indication may have comprised an identifier of the device 140, and an explicit indication of the event. The second previous indication may be, for example, a Monitoring Event Subscribe Request.

In other words, the fifth node 115 may have subscribed to receive notifications about the event, e.g., a location change, with the first node 111 prior to the accessibility by the device 140 to the second domain, and the sending of the fifth indication may be based on that pre-existing subscription request.

The fourth indication may be, e.g., a Monitoring Event Notify message. The fourth indication may comprise an identifier of the device 140, the registered event, and a content of the event, e.g., the new location of the device 140.

The sending in this Action 307 may be implemented, e.g., via the sixth link 157.

In some embodiments, the fourth node 114 may be an AMF.

In some particular embodiments, the third node 113 may be a UDM, the fourth node 114 may be an AMF, and the fifth node 115 may be a SCS, an AS, or an AF.

By the first node 111 sending the fifth indication, the first node 111 may enable the fifth node 115 to keep receiving notifications about the event, e.g., location changes, about the device 140, since the event may continue to be detected and reported immediately after the device 140 may access the second domain.

Figure 4:
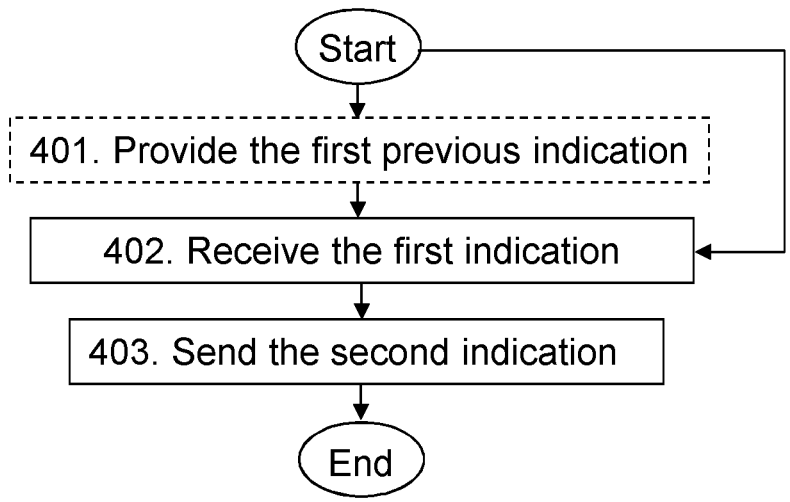
FIG. 4 is a flowchart depicting embodiments of a method in a second node, according to embodiments herein.

Embodiments of a method performed by the second node 112 will now be described with reference to the flowchart depicted in FIG. 4. The method may be understood to be for handling subscriptions in the communications network 100. The second node 112 operates in the communications network 100.

The method may comprise the following actions. Several embodiments are comprised herein. In some embodiments, some actions may be performed, in other embodiments, all actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 4, an optional action is represented in a box with dashed lines.

The detailed description of some of the following corresponds to the same references provided above, in relation to the actions described for the first node 111, and will thus not be repeated here to simplify the description. For example, the first domain may be 4G and the second domain may be 5G.

Action 401

In this Action 401, the second node 112 may provide, the first previous indication. The first previous indication may indicate a capability of the second node 112 to report accessibility for the device 140 to the at least one additional domain in the communications network 100.

Providing may be understood as e.g., sending or sharing, for example, via the first link 151.

In some embodiments, the second node 112 may provide the first previous information to the first node 111 in response to a request from the first node 111.

In some embodiments, the first node 111 may be one of a SCEF, or a NEF, and the second node 112 may one of a HSS-FE, a UDR or a Provisioning Server.

Action 402

In this Action 402, the second node 112 receives, from the first node 111 operating in the communications network 100, the first indication. The first indication requests the subscription to report the new accessibility for the device 140 to the second domain. The second domain is different than the first domain currently accessible by the device 140 operating in the communications network 100.

The receiving in this Action 402 may be implemented, e.g., via the first link 151.

The new accessibility may comprise any one of: provisioning and accessing.

In the embodiments wherein Action 401 may have been implemented, the second node 112 may provide the first previous indication prior to receiving, in this Action 402, the first indication at the second node 112 from the first node 111.

Action 403

In this Action 403, the second node 112 sends the second indication to the first node 111 operating in the communications network 100. The second indication indicates the new accessibility by the device 140 to the second domain.

In this Action 403, the sending may be implemented, e.g., via the first link 151.

Figure 5:
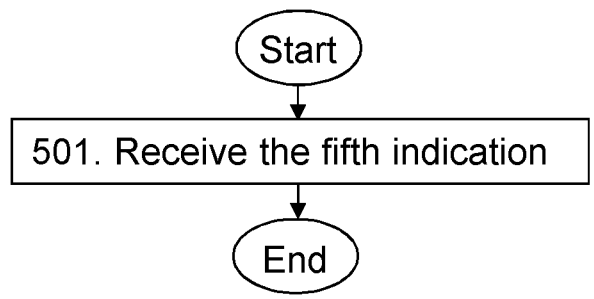
FIG. 5 is a flowchart depicting embodiments of a method in a fifth node, according to embodiments herein.

Embodiments of a method performed by the fifth node 115, will now be described with reference to the flowchart depicted in FIG. 5. The method may be understood to be for handling subscriptions in the communications network 100. The fifth node 115 operates in the communications network 100.

The method comprises the following action. Several embodiments are comprised herein. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples.

The detailed description of some of the following corresponds to the same references provided above, in relation to the actions described for the first node 111, and will thus not be repeated here to simplify the description. For example, the first domain may be 4G and the second domain may be 5G.

Action 501

In this Action 501, the fifth node 115 receives, from the first node 111 operating in the communications network 100, the fifth indication. The fifth indication indicates the notification of the event by the device 140 operating in the communications network 100. The receiving in this Action 501 of the fifth indication and the event have taken place after the new accessibility for the device 140 to the second domain has been enabled in the communications network 100. The receiving in this Action 501 of the fifth indication is based on the second previous indication sent by the fifth node 115 to the first node 111. The second previous indication has been sent prior to the new accessibility for the device 140 to the second domain has been enabled.

The receiving in this Action 501, may be performed, for example, via the sixth link 156.

The new accessibility may comprise any one of: provisioning and accessing.

In some embodiments, the first node 111 may be one of a SCEF, or a NEF, and the fifth node 115 may be an SCS, an AS, or an AF.

The methods just described as being implemented by the first node 111, the second node 112 and the fifth node 115 will now be described in further detail with specific non-limiting examples in the next three figures.

Figure 6:
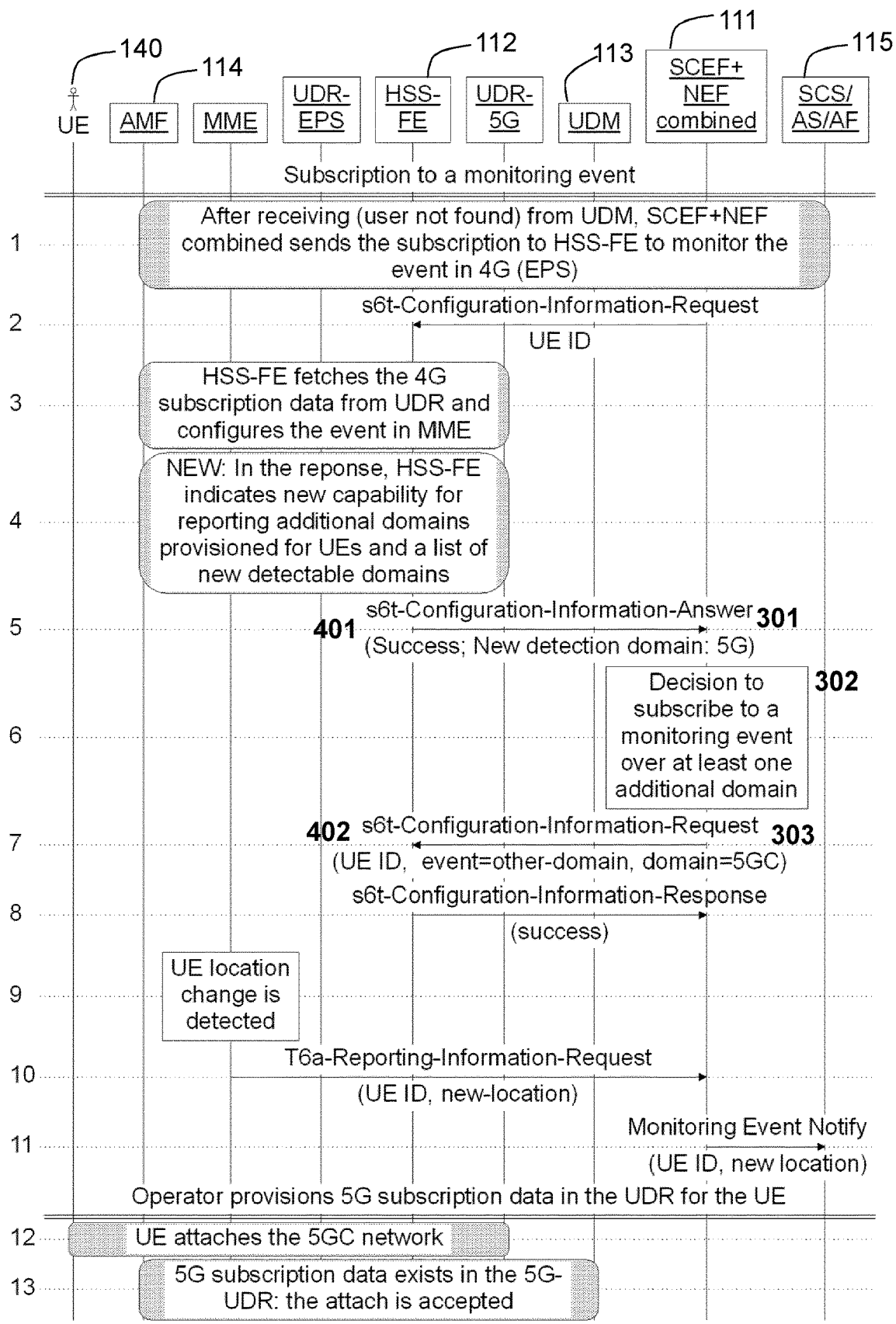
FIG. 6 is a schematic diagram depicting a non-limiting example of signalling between nodes in a communications network, according to embodiments herein.

FIG. 6 is a signalling diagram depicting a non-limiting example of embodiments herein. In this non-limiting example, the first node 111 is an SCEF+NEF combined, the second node 112 is an HSS-FE, the third node 113 is a UDM, the fourth node 114 is an AMF, and the fifth node 115 is an SCS/AS/AF. At step 1 in FIG. 6, having received an indication from the third node 113 that the user of the device 140 is not found, the first node 111 decides to send a subscription to the second node 112 to monitor the event in the first domain, which in this example is 4G. The request is sent at step 2, as an s6t-Configuration-Information-Request, comprising an identifier for the device 140. At step 3, the second node 112 fetches the subscription in the first domain from another node, here the UDR, and configures the event in the MME. In step 4, the second node 112, according to embodiments herein, is enabled to indicate, in its response, a new capability for reporting additional domains provisioned for UEs and a list of new detectable domains. In agreement with this, and according to Action 401, in step 5, the second node 112 sends the first previous indication, here, a Configuration Information Answer response to the Configuration Information Request message of step 2), as an s6t-Configuration-Information-Answer. In this response, the second node 112 indicates the capability for reporting when the user's profile is upgraded with an additional domain. The second node 112 also indicates a list of new domains provisioned for a UE for which it is able to produce a notification, in this example, 5G.

Alternatively, the first node 111 may be aware that the second node 112, e.g., target HSSs, supports this capability by other means, e.g., configuration. This allows the first node 111 to subscribe to this event in the second node 112 for users with active subscriptions in HSS, before this feature is activated.

In step 6, upon receiving the previous response in accordance with Action 301, the first node 111 decides, in accordance with Action 302, to subscribe to the second node 112 for additions of allowed domains to this user. The first node 111, therefore, sends, in accordance with Action 303, to the second node 112, the first indication, here, a new Configuration Information Request message for creating this subscription, in step 7. The subscription is acknowledged in a Configuration Information Response in step 8. Steps 9-11 may take place as described in FIG. 1 for steps 11-13, respectively.

Steps 12 onwards show the use case when the device 140 registers through a new domain, e.g., 5GC domain. The description of steps 12-13 corresponds to that provided in FIG. 1 for steps 14-15.

Figure 7:
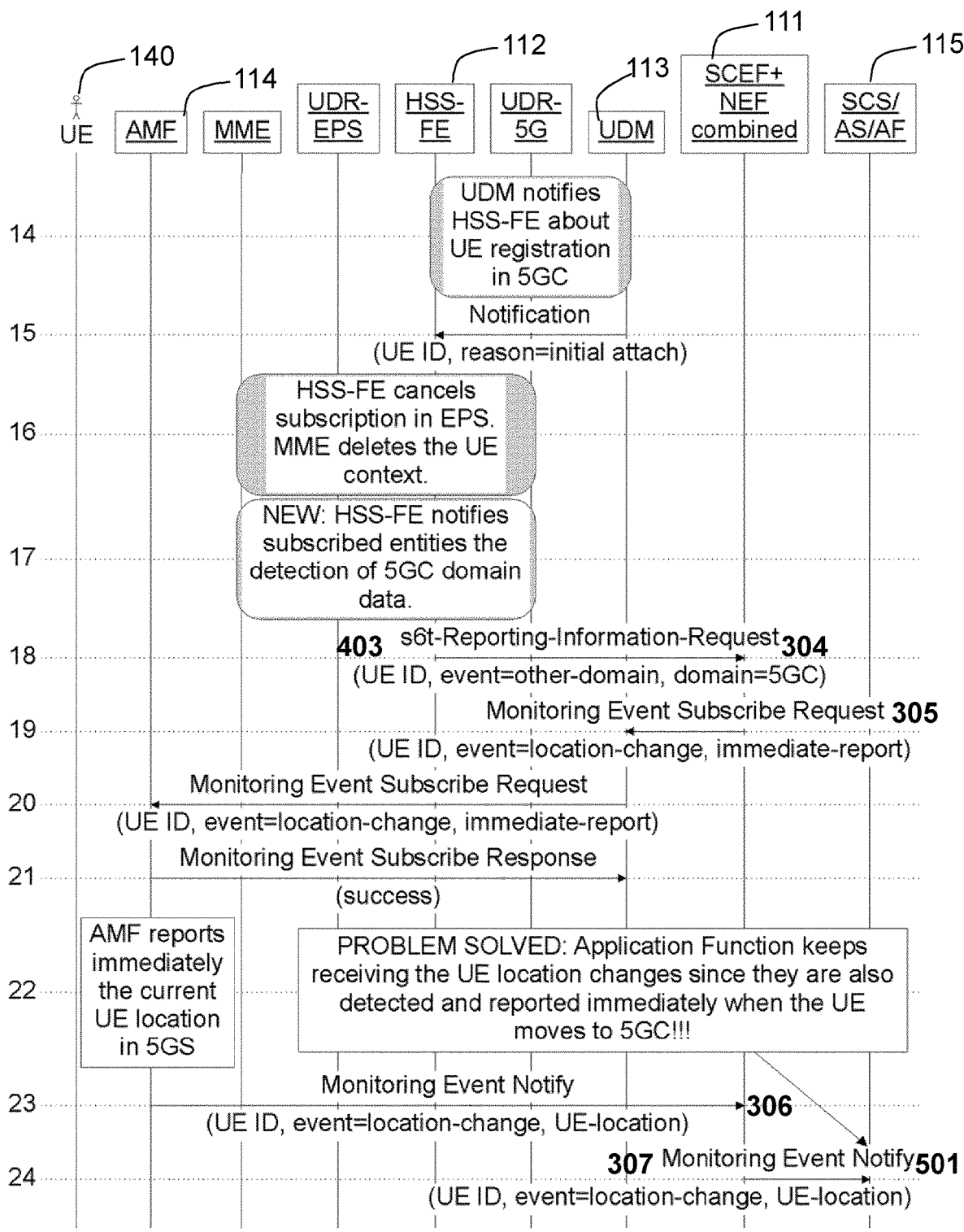
FIG. 7 is a schematic diagram depicting a non-limiting example of signalling between nodes in a communications network, according to embodiments herein.

FIG. 7 is a continuation of the procedure depicted in FIG. 6. The description of steps 14-15 corresponds to that provided in FIG. 1 for step 16. The description of step 16 corresponds to that provided in FIG. 1 for step 17. In step 17 of FIG. 7, upon receiving a notification of the device 140 being registered over a new domain, in step 15 of FIG. 6, the second node 112 notifies all subscribed entities that the user of the device 130 is now available over this new domain. In this case, the second node 112 sends, in accordance with Action 303, the second indication, as a notification message to the first node 111 in step 18.

In step 19, upon receiving the previous notification, in accordance with Action 304, the first node 111 generates, in accordance with Action 305, a subscription message over the new domain, e.g., 5GC domain, to the monitoring event of the user, in the third node 113. The rest of the steps may be performed as subscription steps over the new domain. In step 20, the third node 113 sends a request to monitor the event, as a Monitoring Event Subscribe Request, to the fourth node 114. The request comprises an identifier of the device 140, an identification of the event subscribed as a location change, and request to receive an immediate report indicating the current location of the device 140. At step 21, the fourth node 114 acknowledges receipt of the request by sending a Monitoring Event Subscribe Response indicating success to the third node 113. At step 22, upon a change of location of the device 140, the fourth node 114, based on the presence of the immediate report flag included in the Monitoring Event Subscribe request in step 20, immediately decides to report the current location of the device 140 in 5GS. This is performed in step 23, by sending the fourth indication as a Monitoring Event Notify to the first node 111, comprising an identifier for the device 140 "UE ID", the identification of the event subscribed as a location change, and indicating the current location of the device 140 "UE-location". The first node 111 receives the fourth indication in agreement with Action 306. At step 24, in agreement with Action 307, the first node 111 sends the fifth indication to the fifth node 115 as a Monitoring Event Notify message, comprising the identifier for the device 140 "UE ID", the identification of the event subscribed as a location change, and indicating the current location of the device 140 "UE-location". This solves the problem that was described in relation to FIG. 1, since the fifth node 115, thanks to the embodiments herein, may keep receiving, in agreement with Action 501, the changes of location of the device 140, since they may now be also detected and reported immediately when the device 140 moves to 5GC.

It may be noted that, in the flow depicted in FIG. 6 and FIG. 7, the reception of a notification in the second node 112 from the third node 113 for an initial attach of the device 140 in 5GC in step 15 may be taken as a possible hint about the subscription profile of the device 140 being upgraded to access 5GC, hence the second node 112 may notify the corresponding node, here, the first node 111, which subscribed to the new event.

However, there may be other means for the second node 112 to find out about the subscription profile upgrade of the device 140, e.g., a notification from the provisioning system or the UDR-5G when a 5GC subscription data may be provisioned for the device 140 when existing in 4G only. This is not depicted in detail, since it may not be feasible in real deployments, given that the provisioning system and the UDR-5G may need to send the notifications to all HSS-FEs in the network, even to those not managing any event subscription at that moment. This is because UDR/provisioning system may be understood to not be aware of the first node 111 interested in this event.

Figure 8:
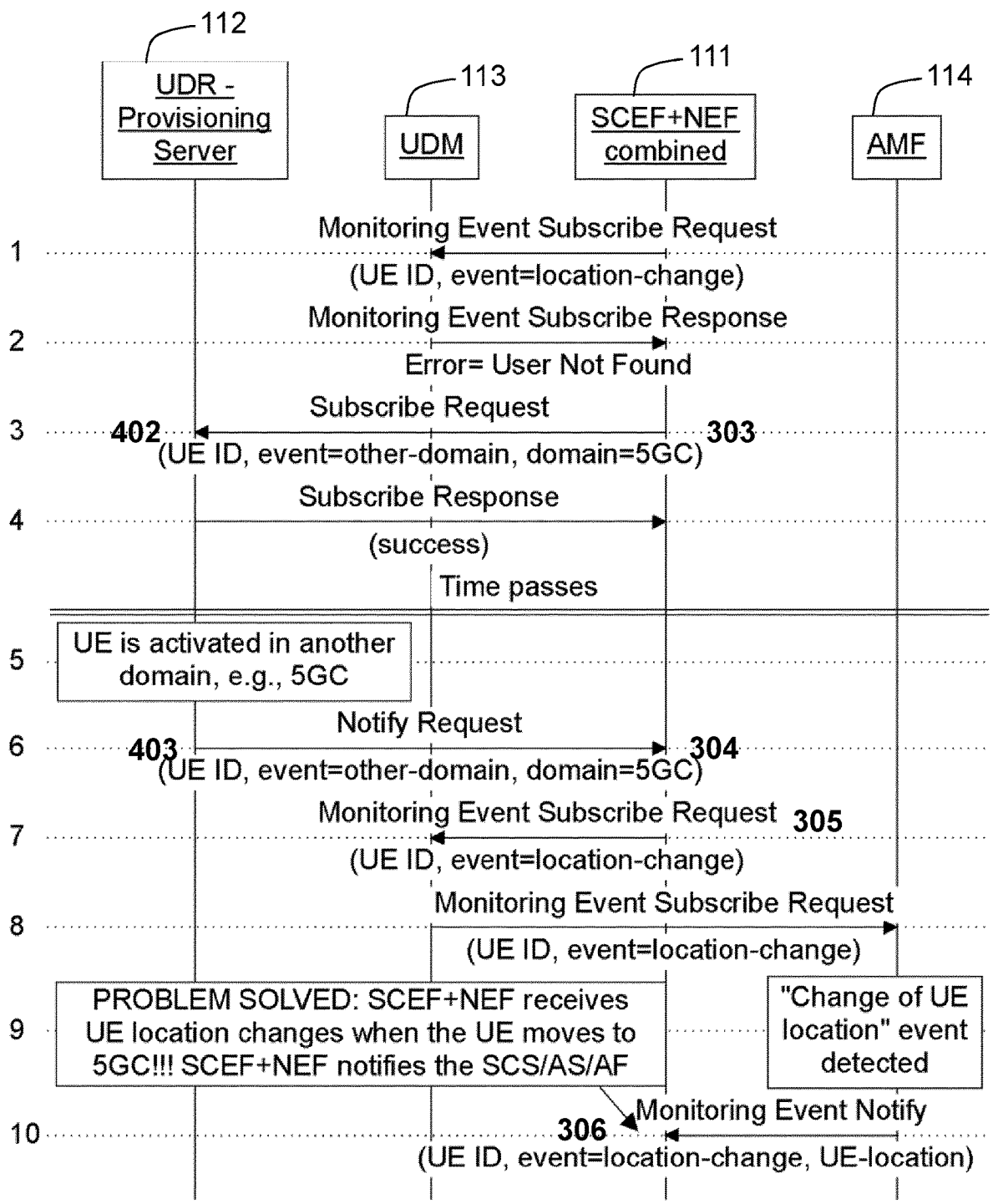
FIG. 8 is a schematic diagram depicting a non-limiting example of signalling between nodes in a communications network, according to embodiments herein.

Alternatively, the first node 111 may subscribe to receive notifications for a specific UE such as the device 140 when it may be allowed/activated in new domains directly at the provisioning system or the UDR-5G itself, e.g., at step 1 in FIG. 8 described next, instead of subscribing to these events via an HSS. FIG. 8 is a signalling diagram depicting a non-limiting example of embodiments herein, wherein the first node 111 may subscribe to Provisioning Events in a UDR and/or Provisioning Server. In this non-limiting example, the first node 111 is an SCEF+NEF combined, the second node 112 is a UDR or a Provisioning Server, the third node 113 is a UDM, and the fourth node 114 is an AMF. The description of step 1 corresponds to that provided in FIG. 1 for step 2, and the description of step 2 corresponds to that provided in FIG. 1 for step 6. In step 3, the first node 111 sends, in accordance with Action 303, the first indication as a request to subscribe to an event, which is here a change of domain, depicted as "other-domain", in particular, a change to the 5GC domain for the device 140, identified with an identifier. The second node 112 receives the first indication in accordance with Action 402 and in step 4, it acknowledges receipt by sending a Subscribe response indicating success. After time passes, at step 5, the device 140 is activated in a second domain, e.g., the 5GC. In step 6, the second node 112, in accordance with Action 403, sends the second indication to the first node 111, as a Notify Request comprising the identifier for the device 140 "UE ID", the identification of the event subscribed as a domain change, in particular, a change to the 5GC domain. The first node 111 receives the second indication in accordance with Action 304, which allows the first node 111 to subscribe to the events in the new domain in step 7, possibly via the third node 113, by sending the third indication to the third node 113, as a Monitoring Event Subscribe Request according to Action 305, the request comprising the identifier for the device 140 "UE ID" and the identification of the event subscribed as a location change. The third node 113 may indicate in step 8 that notifications may need to be addressed to the first node 111 directly. In step 10, when the fourth node 114 identifies the corresponding event in the new domain, in this case a change in the location of the device 140, the first node 111 gets notified by receiving the fourth indication according to Action 306, by receiving a Monitoring Event Notify comprising the identifier for the device 140 "UE ID", the identification of the event subscribed as a location change, as well as the location of the device 140. The first node 111 may then further notify the fifth node 115, e.g., the SCS/AS/AF, which is not shown in the figure.

As a simplified example overview of the foregoing, embodiments herein may be understood to relate to a method for providing service continuity across different domains, the method comprising a receiver of notifications subscribing to an event related to a user over a first domain, a network function in the first domain providing an indication of a capability to report new domains added to the UE's subscription profile, wherein the indication may be sent together with the new domains for a UE that the network function may be able to notify. The method may further comprise the network function of the first domain subscribing to new domains added, configured and/or provisioned for the user, receiving a notification about a user being added a new domain in its profile, notifying about a user being added a new domain towards the receiver of notifications, and initiating a regular subscription to the desired event related to the user over the newly added domain.

One advantage of embodiments herein is that they allow an SCS/AS/AF to continuously receive notifications to subscriptions, e.g., to monitoring events of a user, no matter whether the user may be currently provisioned over all the domains or the user may be provisioned over a single domain and may be allowed to access another domain at a later stage. Overall, this may be understood to allow the SCS/AS/AF to provide a continuous service. independently of the future/new domains the UE may be provisioned with to access the network.

Without a solution like the one proposed in this document, service providers will provide a service that works in a single domain but without service continuity across different domains if the UE is later allowed to access new domains.

Figure 9:
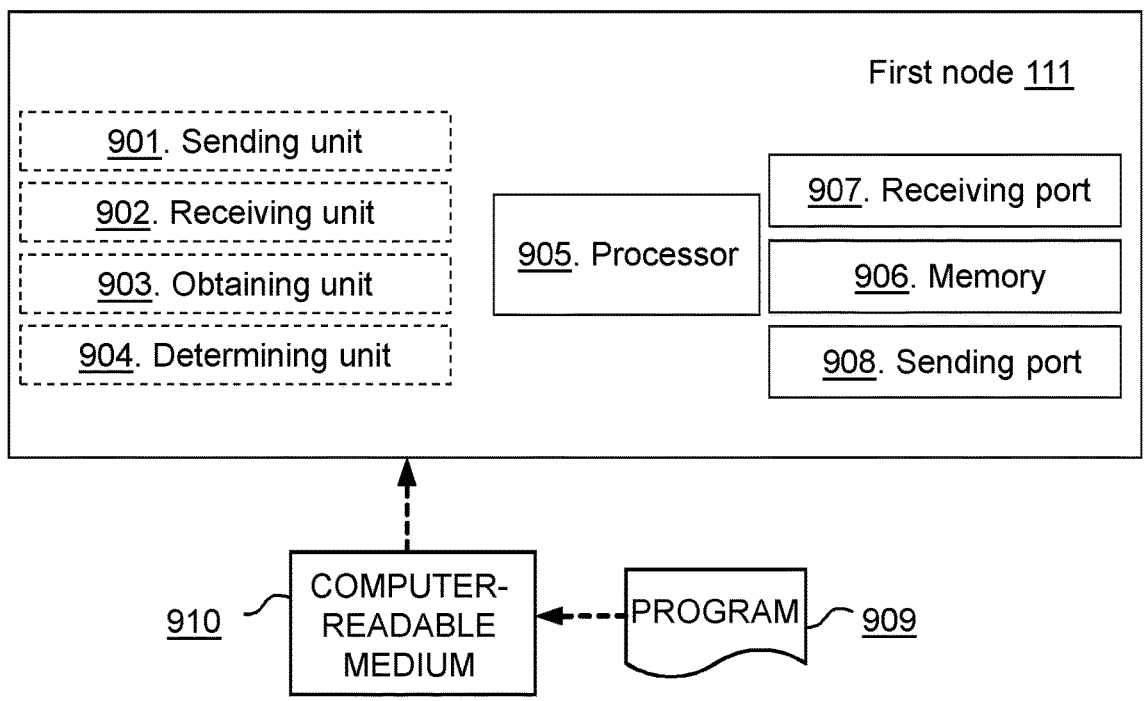
FIG. 9 is a schematic block diagram illustrating two non-limiting examples, a) and b), of a first node, according to embodiments herein.
Figure 9:
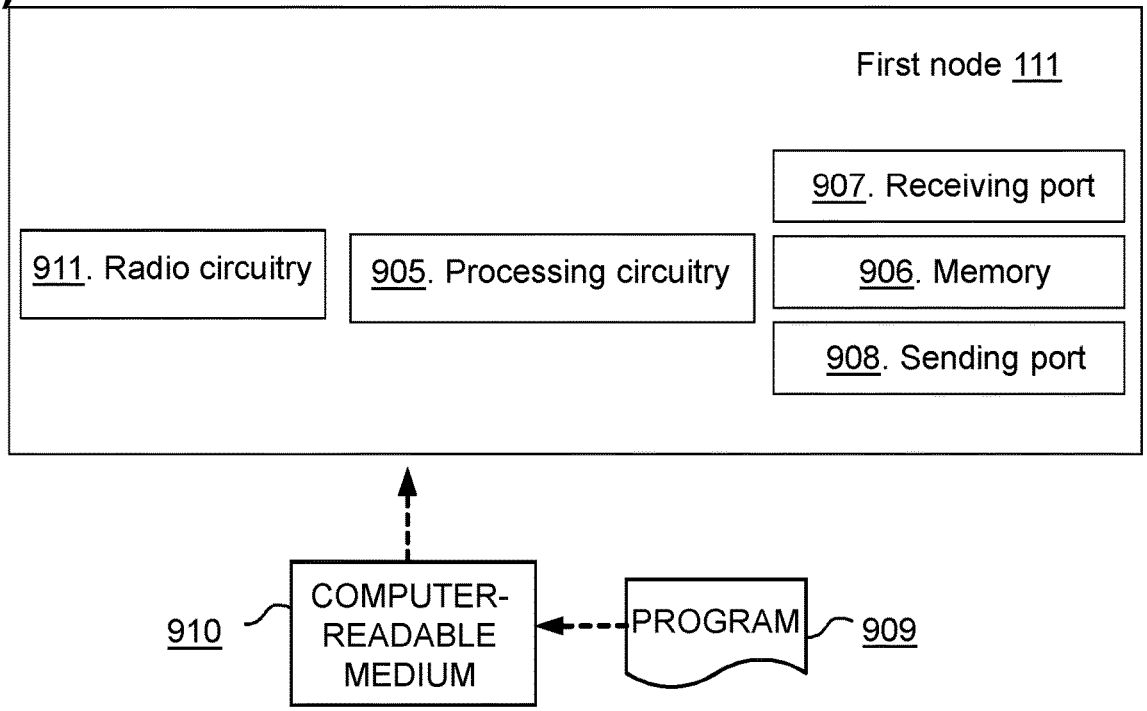

FIG. 9 depicts two different examples in panels a) and b), respectively, of the arrangement that the first node 111 may comprise to perform the method actions described above in relation to FIG. 3. In some embodiments, the first node 111 may comprise the following arrangement depicted in FIG. 9a. The first node 111 may be understood to be for handling subscriptions in the communications network 100. The first node 111 is configured to operate in the communications network 100.

Several embodiments are comprised herein. Components from one embodiment may be tacitly assumed to be present in another embodiment and it will be obvious to a person skilled in the art how those components may be used in the other exemplary embodiments. In FIG. 9, optional boxes are indicated by dashed lines. The detailed description of some of the following corresponds to the same references provided above, in relation to the actions described for the first node 111, and will thus not be repeated here. For example, the first node 111 may be configured to be one of an SCEF, or a NEF, and the second node 112 may be configured to be an HSS Front End (FE), a UDR or a Provisioning Server.

The first node 111 is configured to, e.g. by means of a sending unit 901 within the first node 111 configured to, send, to the second node 112 configured to operate in the communications network 100, the first indication. The first indication is configured to request subscription to report new accessibility for the device 140 to the second domain different than the first domain configured to be currently accessible by the device 140. The device 140 is configured to operate in the communications network 100.

The first node 111 is also configured to, e.g. by means of a receiving unit 902 within the first node 111 configured to, receive the second indication from the second node 112. The second indication is configured to indicate the new accessibility by the device 140 to the second domain.

In some embodiments, the first node 111 may be configured to, e.g. by means of an obtaining unit 903 within the first node 111 configured to, prior to sending the first indication from the first node 111 to the second node 112, obtain the first previous indication. The first previous indication may be configured to indicate the capability of the second node 112 to report the accessibility for the device 140 to at least one additional domain in the communications network 100.

In some embodiments, the first node 111 may be configured to, e.g. by means of a determining unit 904 within the first node 111 configured to, determine to send the first indication, from the first node 111 to the second node 112, based on the obtaining of the first previous indication.

The first node 111 may be further configured to, e.g. by means of the sending unit 901, send the third indication to the third node 113 configured to operate in the communications network 100. The third indication may be configured to indicate the second request to subscribe to the event for the device 140. To send the third indication may be configured to be based on the receiving of the second indication.

In some embodiments, the first node 111 may be further configured to, e.g. by means of the receiving unit 902, receive, from the fourth node 114 configured to operate in the communications network 100, the fourth indication. The fourth indication may be configured to comprise the notification of the event. The receiving of the fourth indication may be configured to be based on the third indication configured to be sent.

The first node 111 may be further configured to, e.g. by means of the sending unit 901, send, to the fifth node 115 configured to operate in the communications network 100, the fifth indication. The fifth indication may be configured to indicate the notification of the event comprised in the fourth indication. The sending of the fifth indication and the event may be configured to have taken place after the new accessibility for the device 140 to the second domain has been enabled in the communications network 100. The sending of the fifth indication may be configured to be based on the second previous indication received by the first node 111 from the fifth node 115. The second previous indication may be configured to have been sent prior to the new accessibility for the device 140 to the second domain has been enabled.

In some embodiments, to obtain the first previous indication may be configured to comprise receiving the first previous indication from the second node 112.

The new accessibility may be configured to comprise any one of: provisioning and accessing.

In some embodiments, the third node 113 may be configured to be configured to be a UDM, the fourth node 114 may be configured to be an AMF, and the fifth node 115 may be configured to be a SCS, an AS, or an AF.

The embodiments herein may be implemented through one or more processors, such as a processor 905 in the first node 111 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the in the first node 111. One such carrier may be in the form of a CD ROM disc. It is however feasible with other data carriers such as a memory stick. The computer program code may furthermore be provided as pure program code on a server and downloaded to the first node 111.

The first node 111 may further comprise a memory 906 comprising one or more memory units. The memory 906 is arranged to be used to store obtained information, store data, configurations, schedulings, and applications etc. to perform the methods herein when being executed in the first node 111.

In some embodiments, the first node 111 may receive information from, e.g., the second node 112, the third node 113, the fourth node 114, and the fifth node 115, through a receiving port 907. In some examples, the receiving port 907 may be, for example, connected to one or more antennas in the first node 111. In other embodiments, the first node 111 may receive information from another structure in the communications network 100 through the receiving port 907. Since the receiving port 907 may be in communication with the processor 905, the receiving port 907 may then send the received information to the processor 905. The receiving port 907 may also be configured to receive other information.

The processor 905 in the first node 111 may be further configured to transmit or send information to e.g., the second node 112, the third node 113, the fourth node 114, the fifth node 115 and/or another structure in the communications network 100, through a sending port 908, which may be in communication with the processor 905, and the memory 906.

Those skilled in the art will also appreciate that any of the units 901-904 described above may refer to a combination of analog and digital circuits, and/or one or more processors configured with software and/or firmware, e.g., stored in memory, that, when executed by the one or more processors such as the processor 905, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Any of the units 901-904 described above may be the processor 905 of the first node 111, or an application running on such processor.

Thus, the methods according to the embodiments described herein for the first node 111 may be respectively implemented by means of a computer program 909 product, comprising instructions, i.e., software code portions, which, when executed on at least one processor 905, cause the at least one processor 905 to carry out the actions described herein, as performed by the first node 111. The computer program 909 product may be stored on a computer-readable storage medium 910. The computer-readable storage medium 910, having stored thereon the computer program 909, may comprise instructions which, when executed on at least one processor 905, cause the at least one processor 905 to carry out the actions described herein, as performed by the first node 111. In some embodiments, the computer-readable storage medium 910 may be a non-transitory computer-readable storage medium, such as a CD ROM disc, a memory stick, or stored in the cloud space. In other embodiments, the computer program 909 product may be stored on a carrier containing the computer program, wherein the carrier is one of an electronic signal, optical signal, radio signal, or the computer-readable storage medium 910, as described above.

The first node 111 may comprise an interface unit to facilitate communications between the first node 111 and other nodes or devices, e.g., the second node 112, the third node 113, the fourth node 114, the fifth node 115, and/or another structure in the communications network 100. In some particular examples, the interface may, for example, include a transceiver configured to transmit and receive radio signals over an air interface in accordance with a suitable standard.

In other embodiments, the first node 111 may comprise the following arrangement depicted in FIG. 9*b*. The first node 111 may comprise a processing circuitry 905, e.g., one or more processors such as the processor 905, in the first node 111 and the memory 906. The first node 111 may also comprise a radio circuitry 911, which may comprise e.g., the receiving port 907 and the sending port 908. The processing circuitry 905 may be configured to, or operable to, perform the method actions according to FIG. 3, in a similar manner as that described in relation to FIG. 9*a*. The radio circuitry 911 may be configured to set up and maintain at least a wireless connection with the second node 112, the third node 113, the fourth node 114, the fifth node 115, and/or another structure in the communications network 100.

Hence, embodiments herein also relate to the first node 111 operative to handle subscriptions in the communications network 100, the first node 111 being operative to operate in the communications network 100. The first node 111 may comprise the processing circuitry 905 and the memory 906, said memory 906 containing instructions executable by said processing circuitry 905, whereby the first node 111 is further operative to perform the actions described herein in relation to the first node 111, e.g., in FIG. 3.

Figure 10:
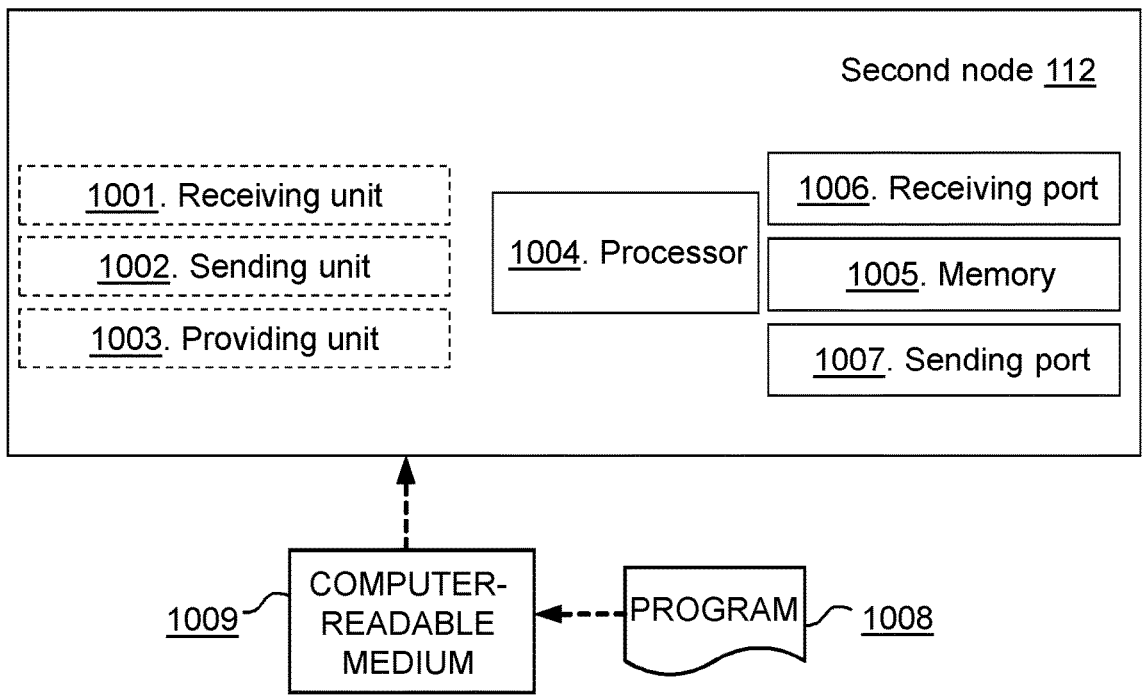
FIG. 10 is a schematic block diagram illustrating two non-limiting examples, a) and b), of a second node, according to embodiments herein.
Figure 10:
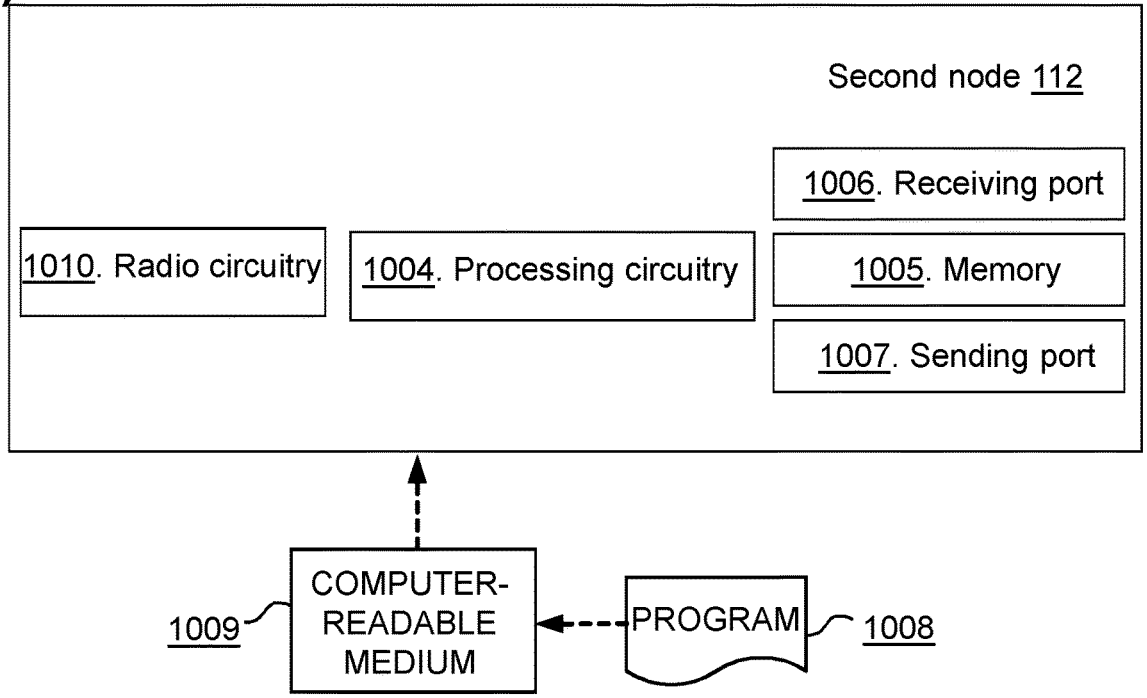

FIG. 10 depicts two different examples in panels a) and b), respectively, of the arrangement that the second node 112 may comprise to perform the method actions described above in relation to FIG. 4. In some embodiments, the second node 112 may comprise the following arrangement depicted in FIG. 10*a*. The second node 112 may be understood to be configured to handle subscriptions in the communications network 100. The second node 112 is configured to operate in the communications network 100.

Several embodiments are comprised herein. Components from one embodiment may be tacitly assumed to be present in another embodiment and it will be obvious to a person skilled in the art how those components may be used in the other exemplary embodiments. In FIG. 10, optional boxes are indicated by dashed lines. The detailed description of some of the following corresponds to the same references provided above, in relation to the actions described for the first node 111, and will thus not be repeated here. For example, the first node 111 may be configured to be one of an SCEF, or a NEF, and the second node 112 may be configured to be one of an HSS FE, a UDR or a Provisioning Server.

The second node 112 is configured to, e.g. by means of a receiving unit 1001 within the second node 112 configured to, receive, from the first node 111 configured to operate in the communications network 100, the first indication. The first indication is configured to request subscription to report new accessibility for the device 140 to the second domain different than the first domain configured to be currently accessible by the device 140. The device 140 is configured to operate in the communications network 100.

The second node 112 is also configured to, e.g. by means of a sending unit 1002 within the second node 112 configured to, send the second indication to the first node 111 configured to operate in the communications network 100, the second indication being configured to indicate the new accessibility by the device 140 to the second domain.

In some embodiments, the second node 112 may be configured to, e.g. by means of a providing unit 1003 within the second node 112 configured to, prior to receiving the first indication at the second node 112 from the first node 111, provide the first previous indication. The first previous indication may be configured to indicate the capability of the second node 112 to report accessibility for the device 140 to the at least one additional domain in the communications network 100.

In some embodiments, the new accessibility may be configured to comprise any one of: provisioning and accessing.

The embodiments herein may be implemented through one or more processors, such as a processor 1004 in the second node 112 depicted in FIG. 10, together with computer program code for performing the functions and actions of the embodiments herein. The program code mentioned above may also be provided as a computer program product, for instance in the form of a data carrier carrying computer program code for performing the embodiments herein when being loaded into the in the second node 112. One such carrier may be in the form of a CD ROM disc. It is however feasible with other data carriers such as a memory stick. The computer program code may furthermore be provided as pure program code on a server and downloaded to the second node 112.

The second node 112 may further comprise a memory 1005 comprising one or more memory units. The memory 1005 is arranged to be used to store obtained information, store data, configurations, schedulings, and applications etc. to perform the methods herein when being executed in the second node 112.

In some embodiments, the second node 112 may receive information from, e.g., the first node 111, the third node 113, the fourth node 114, and the fifth node 115, through a receiving port 1006. In some examples, the receiving port 1006 may be, for example, connected to one or more antennas in the second node 112. In other embodiments, the second node 112 may receive information from another structure in the communications network 100 through the receiving port 1006. Since the receiving port 1006 may be in communication with the processor 1004, the receiving port 1006 may then send the received information to the processor 1004. The receiving port 1006 may also be configured to receive other information.

The processor 1004 in the second node 112 may be further configured to transmit or send information to e.g., the first node 111, the third node 113, the fourth node 114, the fifth node 115, and/or another structure in the communications network 100, through a sending port 1007, which may be in communication with the processor 1004, and the memory 1005.

Those skilled in the art will also appreciate that any of the units 1001-1003 described above may refer to a combination of analog and digital circuits, and/or one or more processors configured with software and/or firmware, e.g., stored in memory, that, when executed by the one or more processors such as the processor 1004, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Any of the units 1001-1003 described above may be the processor 1004 of the second node 112, or an application running on such processor.

Thus, the methods according to the embodiments described herein for the second node 112 may be respectively implemented by means of a computer program 1008 product, comprising instructions, i.e., software code portions, which, when executed on at least one processor 1004, cause the at least one processor 1004 to carry out the actions described herein, as performed by the second node 112. The computer program 1008 product may be stored on a computer-readable storage medium 1009. The computer-readable storage medium 1009, having stored thereon the computer program 1008, may comprise instructions which, when executed on at least one processor 1004, cause the at least one processor 1004 to carry out the actions described herein, as performed by the second node 112. In some embodiments, the computer-readable storage medium 1009 may be a non-transitory computer-readable storage medium, such as a CD ROM disc, a memory stick, or stored in the cloud space. In other embodiments, the computer program 1008 product may be stored on a carrier containing the computer program, wherein the carrier is one of an electronic signal, optical signal, radio signal, or the computer-readable storage medium 1009, as described above.

The second node 112 may comprise an interface unit to facilitate communications between the second node 112 and other nodes or devices, e.g., the first node 111, the third node 113, the fourth node 114, the fifth node 115, and/or another structure in the communications network 100. In some particular examples, the interface may, for example, include a transceiver configured to transmit and receive radio signals over an air interface in accordance with a suitable standard.

In other embodiments, the second node 112 may comprise the following arrangement depicted in FIG. 10b. The second node 112 may comprise a processing circuitry 1004, e.g., one or more processors such as the processor 1004, in the second node 112 and the memory 1005. The second node 112 may also comprise a radio circuitry 1010, which may comprise e.g., the receiving port 1006 and the sending port 1007. The processing circuitry 1004 may be configured to, or operable to, perform the method actions according to FIG. 4, in a similar manner as that described in relation to FIG. 10a. The radio circuitry 1010 may be configured to set up and maintain at least a wireless connection with the first node 111, the third node 113, the fourth node 114, the fifth node 115, and/or another structure in the communications network 100.

Hence, embodiments herein also relate to the second node 112 operative to handle subscriptions in a communications network 100, the second node 112 being operative to operate in the communications network 100. The second node 112 may comprise the processing circuitry 1004 and the memory 1005, said memory 1005 containing instructions executable by said processing circuitry 1004, whereby the second node 112 is further operative to perform the actions described herein in relation to the second node 112, e.g., in FIG. 4.

Figure 11:
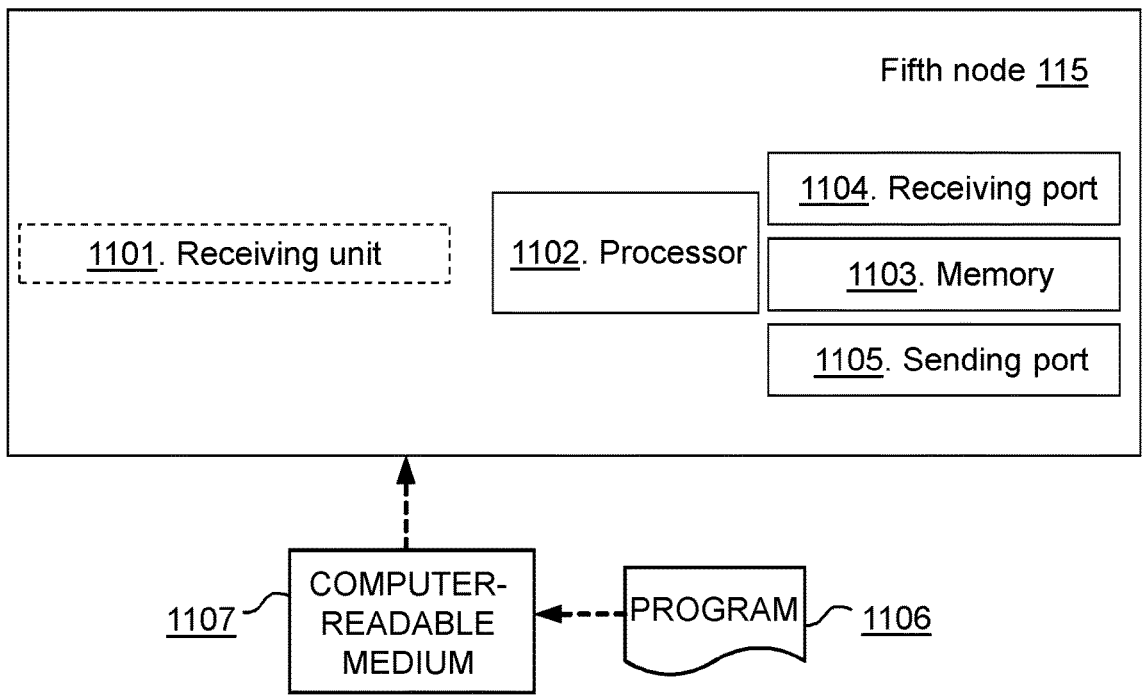
FIG. 11 is a schematic block diagram illustrating two non-limiting examples, a) and b), of a fifth node, according to embodiments herein.
Figure 11:
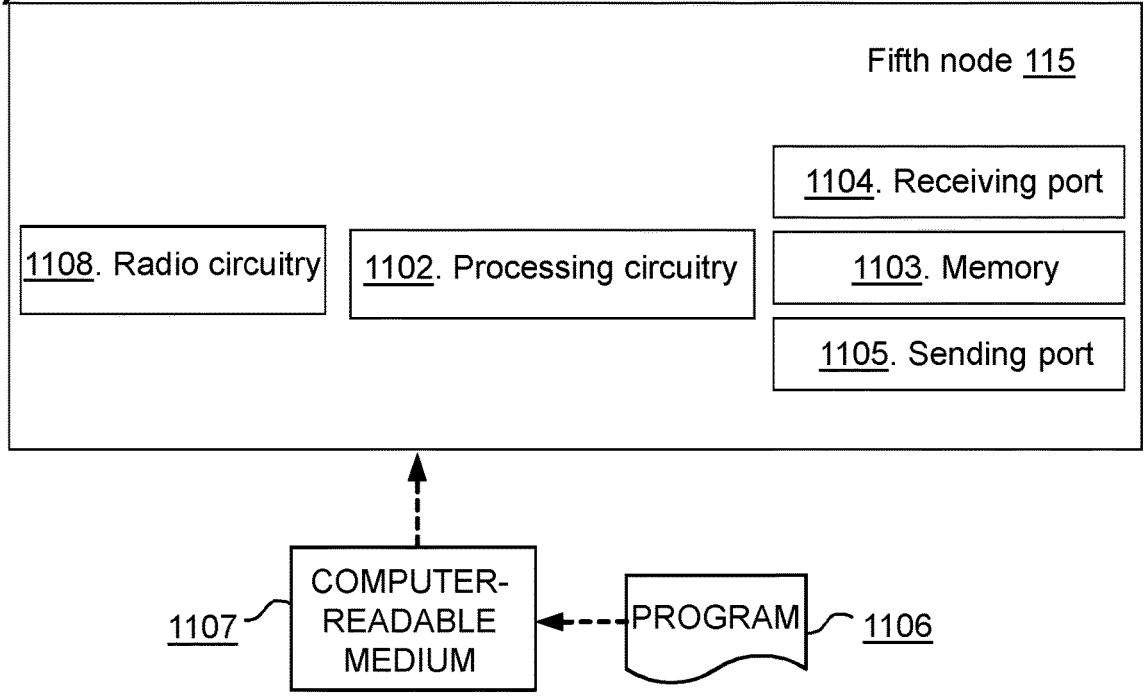

FIG. 11 depicts two different examples in panels a) and b), respectively, of the arrangement that the fifth node 115 may comprise to perform the method actions described above in relation to FIG. 5. In some embodiments, the fifth node 115 may comprise the following arrangement depicted in FIG. 11a. The fifth node 115 may be understood to be configured to handle subscriptions in the communications network 100.

Several embodiments are comprised herein. Components from one embodiment may be tacitly assumed to be present in another embodiment and it will be obvious to a person skilled in the art how those components may be used in the other exemplary embodiments. In FIG. 11, optional boxes are indicated by dashed lines. The detailed description of some of the following corresponds to the same references provided above, in relation to the actions described for the fifth node 115, and will thus not be repeated here. For example, the first node 111 may be configured to be one of an SCEF, or a NEF, and the fifth node 115 may be configured to be an SCS, an AS, or an AF.

The fifth node 115 is configured to, e.g. by means of a receiving unit 1101 within the fifth node 115 configured to receive, from the first node 111 configured to operate in the communications network 100, the fifth indication. The fifth indication is configured to indicate the notification of the event by the device 140 configured to operate in the communications network 100. The receiving of the fifth indication and the event are configured to have taken place after the new accessibility for the device 140 to the second domain has been enabled in the communications network 100. The receiving of the fifth indication is configured to be based on the second previous indication configured to be sent by the fifth node 115 to the first node 111. The second previous indication is configured to have been sent prior to the new accessibility for the device 140 to the second domain has been enabled.

In some embodiments, the new accessibility may be configured to comprise any one of: provisioning and accessing.

The embodiments herein may be implemented through one or more processors, such as a processor 1102 in the fifth node 115 depicted in FIG. 11, together with computer program code for performing the functions and actions of the embodiments herein. The program code mentioned above may also be provided as a computer program product, for instance in the form of a data carrier carrying computer program code for performing the embodiments herein when being loaded into the in the fifth node 115. One such carrier may be in the form of a CD ROM disc. It is however feasible with other data carriers such as a memory stick. The computer program code may furthermore be provided as pure program code on a server and downloaded to the fifth node 115.

The fifth node 115 may further comprise a memory 1103 comprising one or more memory units. The memory 1103 is arranged to be used to store obtained information, store data, configurations, schedulings, and applications etc. to perform the methods herein when being executed in the fifth node 115.

In some embodiments, the fifth node 115 may receive information from, e.g., the first node 111, the second node 112, the third node 113, and/or the fourth node 114, through a receiving port 1104. In some examples, the receiving port 1104 may be, for example, connected to one or more antennas in the fifth node 115. In other embodiments, the fifth node 115 may receive information from another structure in the communications network 100 through the receiving port 1104. Since the receiving port 1104 may be in communication with the processor 1102, the receiving port 1104 may then send the received information to the processor 1102. The receiving port 1104 may also be configured to receive other information.

The processor 1102 in the fifth node 115 may be further configured to transmit or send information to e.g., the first node 111, the second node 112, the third node 113, the fourth node 114, and/or another structure in the communications network 100, through a sending port 1105, which may be in communication with the processor 1102, and the memory 1103.

Those skilled in the art will also appreciate that the unit 1101 described above may refer to a combination of analog and digital circuits, and/or one or more processors configured with software and/or firmware, e.g., stored in memory, that, when executed by the one or more processors such as the processor 1102, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

The unit 1101 described above may be the processor 1102 of the fifth node 115, or an application running on such processor.

Thus, the methods according to the embodiments described herein for the fifth node 115 may be respectively implemented by means of a computer program 1106 product, comprising instructions, i.e., software code portions, which, when executed on at least one processor 1102, cause the at least one processor 1102 to carry out the actions described herein, as performed by the fifth node 115. The computer program 1106 product may be stored on a computer-readable storage medium 1107. The computer-readable storage medium 1107, having stored thereon the computer program 1106, may comprise instructions which, when executed on at least one processor 1102, cause the at least one processor 1102 to carry out the actions described herein, as performed by the fifth node 115. In some embodiments, the computer-readable storage medium 1107 may be a non-transitory computer-readable storage medium, such as a CD ROM disc, a memory stick, or stored in the cloud space. In other embodiments, the computer program 1106 product may be stored on a carrier containing the computer program, wherein the carrier is one of an electronic signal, optical signal, radio signal, or the computer-readable storage medium 1107, as described above.

The fifth node 115 may comprise an interface unit to facilitate communications between the fifth node 115 and other nodes or devices, e.g., the first node 111, the second node 112, the third node 113, the fourth node 114, and/or another structure in the communications network 100. In some particular examples, the interface may, for example, include a transceiver configured to transmit and receive radio signals over an air interface in accordance with a suitable standard.

In other embodiments, the fifth node 115 may comprise the following arrangement depicted in FIG. 11b. The fifth node 115 may comprise a processing circuitry 1102, e.g., one or more processors such as the processor 1102, in the fifth node 115 and the memory 1103. The fifth node 115 may also comprise a radio circuitry 1108, which may comprise e.g., the receiving port 1104 and the sending port 1105. The processing circuitry 1102 may be configured to, or operable to, perform the method actions according to FIG. 5, in a similar manner as that described in relation to FIG. 11a. The radio circuitry 1108 may be configured to set up and maintain at least a wireless connection with the first node 111, the second node 112, the third node 113, the fourth node 114, and/or another structure in the communications network 100.

Hence, embodiments herein also relate to the fifth node 115 operative to handle subscriptions in the communications network 100, the fifth node 115 being operative to operate in the communications network 100. The fifth node 115 may comprise the processing circuitry 1102 and the memory 1103, said memory 1103 containing instructions executable by said processing circuitry 1102, whereby the fifth node 115 is further operative to perform the actions described herein in relation to the fifth node 115, e.g., in FIG. 5.

When using the word "comprise" or "comprising", it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

Any of the terms processor and circuitry may be understood herein as a hardware component.

As used herein, the expression "in some embodiments" has been used to indicate that the features of the embodiment described may be combined with any other embodiment or example disclosed herein.

As used herein, the expression "in some examples" has been used to indicate that the features of the example described may be combined with any other embodiment or example disclosed herein.

REFERENCES 1. 3GPP TS 23.501 version 16.3.0: System architecture for the 5G System (5GS).
2. 3GPP TS 23.502 version 16.3.0: Procedures for the 5G System (5GS).
3. 3GPP TS 23.632 version 16.0.0: User data interworking, coexistence and migration; Stage 2.
4. 3GPP TS 23.682 version 16.5.0: Architecture enhancements to facilitate communications with packet data networks and applications.

The invention claimed is:

1. A method, performed by a first node, for handling subscriptions in a communications network, the first node operating in the communications network, the method comprising:
   obtaining a first previous indication, the first previous indication indicating a capability of a second node operating in the communications network to report accessibility for a device to at least one additional domain in the communications network,
   determining to send a first indication, from the first node to the second node, based on the obtaining of the first previous indication,
   subsequent to obtaining the first previous indication and determining to send the first indication, sending, to the second node, the first indication, the first indication requesting subscription to report new accessibility for the device to a second domain different than a first domain currently accessible by the device operating in the communications network, and
   receiving a second indication from the second node, the second indication indicating the new accessibility by the device to the second domain.

2. The method according to claim 1, wherein the method further comprises:
   sending a third indication to a third node operating in the communications network, the third indication indicating a second request to subscribe to an event for the device, and wherein the sending of the third indication is based on the receiving of the second indication.

3. The method according to claim 2, the method further comprising:
   receiving, from a fourth node operating in the communications network, a fourth indication comprising a notification of the event and wherein the receiving of the fourth indication is based on the sent third indication.

4. The method according to claim 3, the method further comprising:
   sending, to a fifth node operating in the communications network, a fifth indication indicating the notification of the event comprised in the fourth indication, wherein:
   the sending of the fifth indication and the event have taken place after the new accessibility for the device to the second domain has been enabled in the communications network, and
   the sending of the fifth indication is based on a second previous indication received by the first node from the fifth node, the second previous indication having been sent prior to the new accessibility for the device to the second domain has been enabled.

5. The method according to claim 4, wherein the obtaining of the first previous indication comprises receiving the first previous indication from the second node.

6. The method according to claim 4, wherein the third node is a Unified Data Management, UDM, the fourth node is an Access and mobility Management Function, AMF, and the fifth node is a Service Capability Server, SCS, an Application Server, AS, or an Application Function, AF.

7. The method according to claim 1, wherein the new accessibility comprises any one of: provisioning and accessing.

8. The method according to claim 1, wherein the first node is one of a Service Capability Exposure Function, SCEF, or a Network Exposure Function NEF, and the second node is one of a Home Subscriber Server, HSS, Front End, FE.

9. A non-transitory computer readable storage medium storing thereon a computer program, comprising instructions which, when executed on at least one processor, cause the at least one processor to carry out the method according to claim 1.

10. A first node, for handling subscriptions in a communications network, the first node being configured to operate in the communications network, the first node being further configured to:
    obtain a first previous indication, the first previous indication indicating a capability of a second node operating in the communications network to report accessibility for a device to at least one additional domain in the communications network,
    determine to send a first indication, from the first node to the second node, based on the obtaining of the first previous indication,
    subsequent to obtaining the first previous indication and determining to send the first indication, send, to the second node, the first indication, the first indication being configured to request subscription to report new accessibility for the device to a second domain different than a first domain configured to be currently accessible by the device, the device being configured to operate in the communications network, and
    receive a second indication from the second node, the second indication being configured to indicate the new accessibility by the device to the second domain.

11. The first node according to claim 10, wherein the first node is further configured to:
    send a third indication to a third node configured to operate in the communications network, the third indication being configured to indicate a second request to subscribe to an event for the device, and wherein to send the third indication is configured to be based on the receiving of the second indication.

12. The first node according to claim 11, the first node being further configured to:
    receive, from a fourth node configured to operate in the communications network, a fourth indication configured to comprise a notification of the event, and wherein the receiving of the fourth indication is configured to be based on the third indication configured to be sent.

13. The first node according to claim 12, the first node being further configured to:
    send, to a fifth node configured to operate in the communications network, a fifth indication configured to indicate the notification of the event comprised in the fourth indication, wherein:
    the sending of the fifth indication and the event are configured to have taken place after the new accessibility for the device to the second domain has been enabled in the communications network, and the sending of the fifth indication is configured to be based on a second previous indication received by the first node from the fifth node, the second previous indication being configured to have been sent prior to the new accessibility for the device to the second domain has been enabled.

14. The first node according to claim 13, wherein to obtain the first previous indication is configured to comprise receiving the first previous indication from the second node.

15. The first node according to claim 11, wherein the third node is configured to be configured to be a Unified Data Management, UDM, the fourth node is configured to be an Access and mobility Management Function, AMF, and the fifth node is configured to be a Service Capability Server, SCS, an Application Server, AS, or an Application Function, AF.

16. The first node according to claim 10, wherein the new accessibility is configured to comprise any one of: provisioning and accessing.

17. The first node according to claim 10, wherein the first node is configured to be one of a Service Capability Exposure Function, SCEF, or a Network Exposure Function NEF, and the second node is configured to be one of a Home Subscriber Server, HSS, Front End, FE.

18. A second node, for handling subscriptions in a communications network, the second node being configured to operate in the communications network, the second node being further configured to:
provide a first previous indication, the first previous indication being configured to indicate a capability of the second node to report accessibility for a device to the at least one additional domain in the communications network,
subsequent to providing the first previous indication, receive, from a first node configured to operate in the communications network, a first indication, the first indication being configured to request subscription to report new accessibility for the device to a second domain different than a first domain configured to be currently accessible by the device, the device being configured to operate in the communications network, and
send a second indication to the first node configured to operate in the communications network, the second indication being configured to indicate the new accessibility by the device to the second domain.

19. The second node according to claim 18, wherein the first node is configured to be one of a Service Capability Exposure Function, SCEF, or a Network Exposure Function NEF, and the second node is configured to be one of a Home Subscriber Server, HSS, Front End, FE, a Unified Data Repository (UDR) or a Provisioning Server.

20. The second node according to claim 18, wherein the new accessibility is configured to comprise any one of: provisioning and accessing.

* * * * *